(12) United States Patent
Yamamoto

(10) Patent No.: US 11,660,794 B2
(45) Date of Patent: May 30, 2023

(54) INJECTION MOLDING MACHINE, INJECTION MOLDING APPARATUS, AND INJECTION MOLDING METHOD

(71) Applicant: TOYOTA JIDOSHA KABUSHIKI KAISHA, Toyota (JP)

(72) Inventor: Yasuhiro Yamamoto, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/452,085

(22) Filed: Oct. 25, 2021

(65) Prior Publication Data

US 2022/0152898 A1    May 19, 2022

(30) Foreign Application Priority Data

Nov. 16, 2020    (JP) .............................. JP2020-190145

(51) Int. Cl.
    *B29C 45/53*        (2006.01)
    *B29C 45/58*        (2006.01)

(52) U.S. Cl.
    CPC .......... *B29C 45/535* (2013.01); *B29C 45/531* (2013.01); *B29C 45/581* (2013.01); *B29C 45/586* (2013.01)

(58) Field of Classification Search
    CPC ... B29C 45/535; B29C 45/531; B29C 45/581; B29C 45/586; B29C 2045/537; B29C 2045/545
    See application file for complete search history.

(56) References Cited

U.S. PATENT DOCUMENTS

| | | | |
|---|---|---|---|
| 2,366,417 A | | 1/1945 | MacMillin |
| 2,798,256 A | | 7/1957 | Eynard |
| 3,109,198 A | * | 11/1963 | Guignard ................ B29C 45/00 |
| | | | 264/DIG. 41 |
| 4,591,467 A | * | 5/1986 | Kopernicky .......... B29C 48/793 |
| | | | 264/102 |
| 2012/0306113 A1 | * | 12/2012 | Kershaw ................ B29C 45/76 |
| | | | 264/40.7 |

(Continued)

FOREIGN PATENT DOCUMENTS

| | | |
|---|---|---|
| EP | 2 998 095 A1 | 3/2016 |
| JP | 2012-192543 A | 10/2012 |

(Continued)

*Primary Examiner* — Kelly M Gambetta
*Assistant Examiner* — Virak Nguon
(74) *Attorney, Agent, or Firm* — Oblon, McClelland, Maier & Neustadt, L.L.P.

(57) ABSTRACT

An injection molding machine that contributes to improving the quality of a workpiece is provided. An injection molding machine configured to causes torpedo pistons to be slid in one way to thereby plasticize a resin material supplied to a first space of a cylinder, and causes a molten resin to flow into a second space of the cylinder and causes the torpedo pistons to be slid in the other way to thereby inject the molten resin. The injection molding machine includes pressurizing pistons inserted into the torpedo pistons so that the pressurizing pistons can be slid in such a way that an amount of protrusion of the cylinder into the second space of the cylinder with respect to the torpedo pistons is changed, and energizing means for energizing the pressurizing pistons toward the second space of the cylinder.

10 Claims, 20 Drawing Sheets

(56) References Cited

U.S. PATENT DOCUMENTS

2020/0189187 A1\* 6/2020 Streicher ................ B29C 64/20

FOREIGN PATENT DOCUMENTS

| JP | 2012192543 A | \* 10/2012 |
| JP | 2014-73621 A | 4/2014 |
| JP | 2014-162046 A | 9/2014 |
| JP | 2015-168135 A | 9/2015 |
| JP | 2017-132039 A | 8/2017 |
| JP | 2020-055198 A | 4/2020 |
| WO | WO 2012/125380 A2 | 9/2012 |
| WO | WO 2018/086792 A1 | 5/2018 |

\* cited by examiner

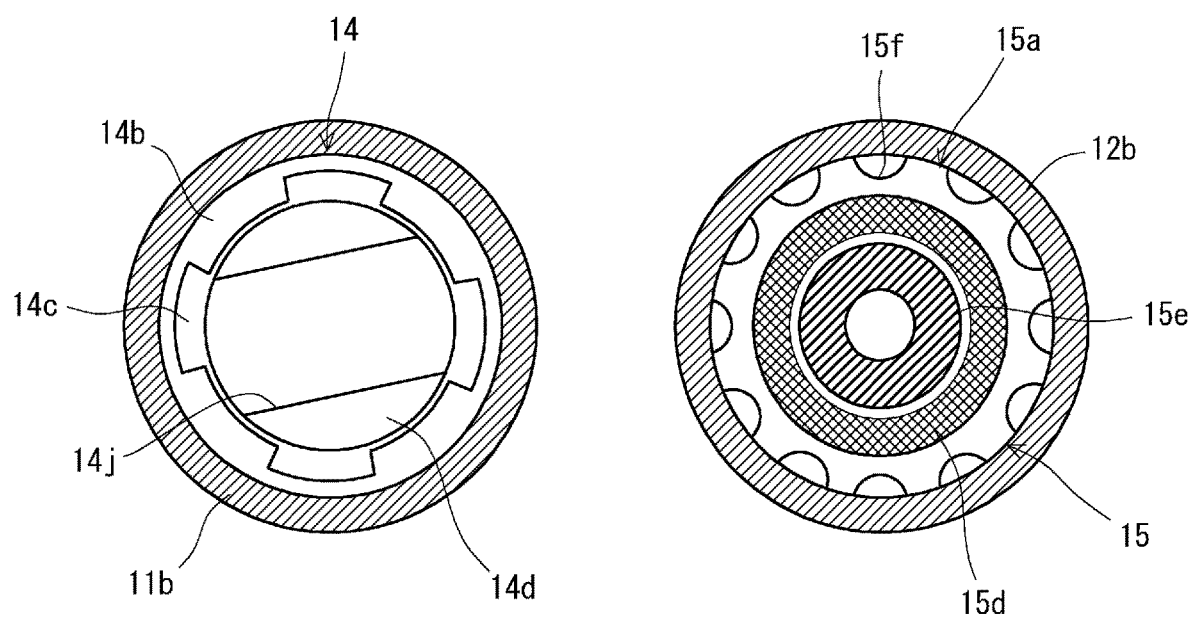
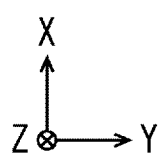
Fig. 5

Fig. 10
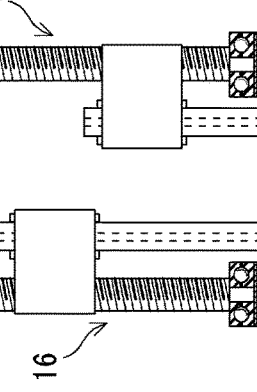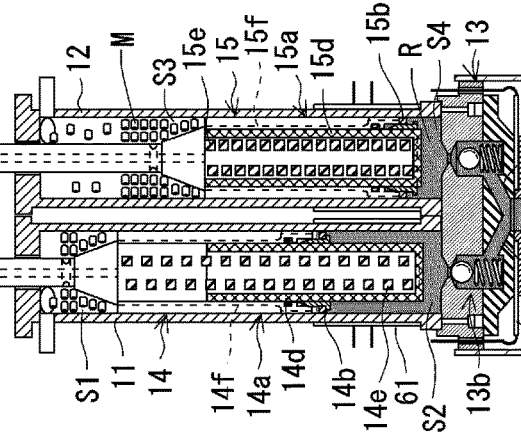
(a) PLASTICIZING IN FIRST CYLINDER
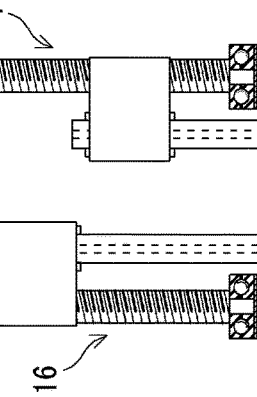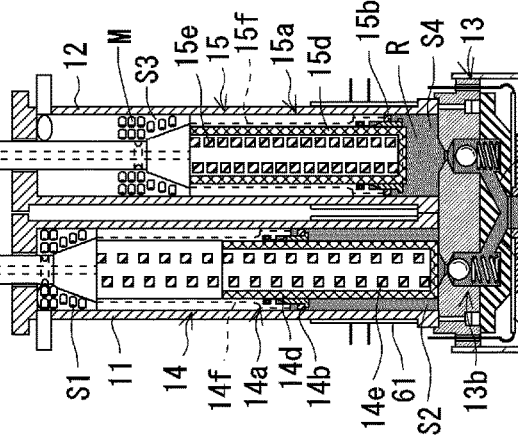
(b) INJECTION FROM SECOND CYLINDER / FIRST PISTON UNIT INVERSION
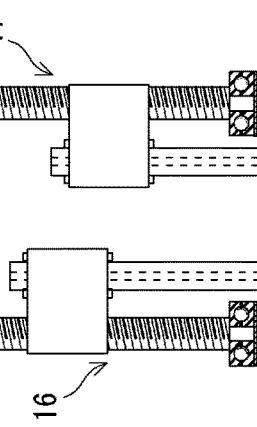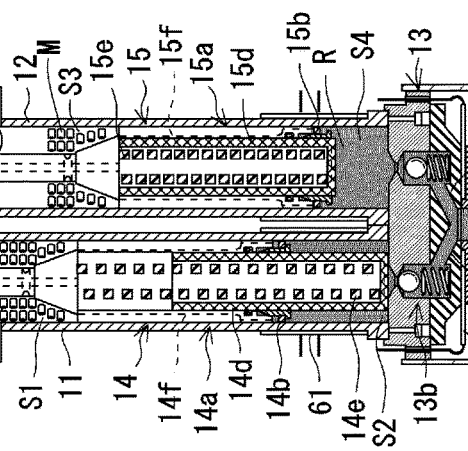
(c) PRESSURIZING IN FIRST CYLINDER / FILL SECOND CYLINDER

INJECTION MOLDING MACHINE, INJECTION MOLDING APPARATUS, AND INJECTION MOLDING METHOD

CROSS REFERENCE TO RELATED APPLICATIONS

This application is based upon and claims the benefit of priority from Japanese patent application No. 2020-190145, filed on Nov. 16, 2020, the disclosure of which is incorporated herein in its entirety by reference.

BACKGROUND

The present disclosure relates to an injection molding machine, an injection molding apparatus, and an injection molding method.

An injection molding machine disclosed in Japanese Unexamined Patent Application Publication No. 2017-132039 includes a barrel having an end part in which an outlet is formed, a hopper connected to the barrel, a torpedo that is slid in the barrel and to which an end part of the rod is fixed, and a plunger that is arranged on a side of an open port of the barrel and through which a rod is made to pass.

When a molten resin is injected using the above injection molding machine, first, the plunger is moved toward a side of the barrel opposite to the side of the barrel where the outlet is provided in a state in which the plunger is fixed to the rod, a connection port of the barrel and the hopper (i.e., a supply hole of a resin material) is opened, and the resin material is supplied from the supply hole to a space in the barrel provided on the side of the plunger with respect to the torpedo.

Next, the state in which the plunger is fixed to the rod is released, the plunger is made to move toward the outlet of the barrel, the supply hole of the barrel is closed by the plunger, and the open port of the barrel is closed. In this state, the torpedo is made to move toward a side of the barrel that is opposite to the side of the outlet of the barrel in the barrel via the rod.

Then, the resin material passes groove parts in the torpedo and is plasticized to be a molten resin, and this molten resin flows into the space in the barrel on the side of the outlet with respect to the torpedo in the barrel. Then, the torpedo is made to move toward the outlet of the barrel and the molten resin is injected from the outlet.

SUMMARY

Applicant has found the following problem. The injection molding apparatus according to Japanese Unexamined Patent Application Publication No. 2017-132039 has a structure in which the resin material is supplied to a space in the barrel on the side of the plunger with respect to the torpedo in the barrel in a state in which the rod is arranged in this space, and the plasticized molten resin flows into the space in the barrel on the side of the outlet with respect to the torpedo in the barrel. At this time, a rod is not arranged in the space in the barrel on the side of the outlet with respect to the torpedo in the barrel.

Therefore, when the torpedo is moved in the barrel to a side of the barrel that is opposite to the side in which the outlet is provided, an amount of increase in the volume of the space in the barrel on the side of the outlet with respect to the torpedo is larger than an amount of decrease in the volume of the space in the barrel on the side of the plunger with respect to the torpedo, which may cause gas to flow into the space in the barrel on the side of the outlet with respect to the torpedo when the molten resin flows into this space. As a result, the molten resin into which gas is mixed may be injected, which may cause the quality of the workpiece to be reduced.

The present disclosure has been made in view of the aforementioned problem and provides an injection molding machine, an injection molding apparatus, and an injection molding method that contribute to improving the quality of a workpiece.

An injection molding machine according to an aspect of the present disclosure is an injection molding machine configured to cause a torpedo piston to be slid toward a side of a cylinder opposite to a side of the cylinder to which an injection part is fixed inside the cylinder to thereby plasticize a resin material supplied to a first space in the cylinder arranged on the side of the cylinder opposite to the side of the cylinder close to the injection part with the torpedo piston interposed therebetween, and to cause a molten resin to flow into a second space in the cylinder on the side of the cylinder close to the injection part with the torpedo piston interposed therebetween part and cause the torpedo piston to be slid toward the injection part inside the cylinder to thereby inject the molten resin from the injection part, the injection molding machine including:

a pressurizing piston that is inserted into a sliding part formed in the torpedo piston so that the pressurizing piston can be slid in an axial direction of the cylinder in such a way that an amount of protrusion of the cylinder into the second space with respect to the torpedo piston is changed, and energizing means for energizing the pressurizing piston toward the second space of the cylinder with respect to the torpedo piston.

The aforementioned injection molding machine may include:

a drive part that slides the torpedo piston inside the cylinder by moving a rod connected to the torpedo piston in an axial direction of the cylinder, in which an area of a region in the pressurizing piston surrounded by an outer periphery in a cross section of the pressurizing piston that is perpendicular to the direction in which the pressurizing piston is slid is equal to or larger than an area of a region of the rod surrounded by an outer periphery in a cross section of the rod that is perpendicular to an axial direction of the rod, and the volume of the second space in a state in which the torpedo piston is arranged on a side of the cylinder opposite to a part of the cylinder closest to the injection part in order to inject the molten resin and the pressurizing piston is arranged in the second space of the cylinder is equal to or smaller than the volume of the first space in a state in which the torpedo piston is arranged in a part of the cylinder closest to the injection part in order to plasticize the resin material and the rod is arranged in the first space of the cylinder.

In the above injection molding machine, the energizing means may energize, when the torpedo piston is moved toward a side of the cylinder opposite to the side of the cylinder close to the injection part in order to plasticize the resin material, the pressurizing piston in such a way that an amount of increase in the volume of the second space of the cylinder becomes equal to or smaller than an amount of decrease in the volume of the first space of the cylinder.

In the above injection molding machine, an enter part which the molten resin enters may be formed in an end part of the pressurizing piston on a side of the pressurizing piston close to the injection part.

The above injection molding machine may include:

a plurality of cylinders;

a plurality of torpedo pistons that are slid inside the respective cylinders;

a plurality of pressurizing pistons inserted into sliding parts of the respective torpedo pistons in such a way that the pressurizing pistons can be slid;

the energizing means for energizing each of the pressurizing pistons; and a plurality of drive parts configured to drive the respective torpedo pistons, in which the plurality of drive parts are controlled in such a way that a period during which a molten resin is injected from at least a first cylinder of the plurality of cylinders overlaps a period during which a molten resin is injected from a second cylinder of the plurality of cylinders for a preset period and that the molten resin is continuously injected from the plurality of cylinders.

An injection molding apparatus according to an aspect of the present disclosure includes:

the aforementioned injection molding machine;

a valve configured to seal and open the first space of the cylinder; and a supply part configured to supply a resin material to the first space based on the flow of gas to the first space of the cylinder.

The aforementioned injection molding apparatus may include a robot arm connected to the injection molding machine.

An injection molding method according to one aspect of the present disclosure may be an injection molding method for causing a torpedo piston to be slid toward a side of a cylinder opposite to a side of the cylinder to which an injection part is fixed inside the cylinder to thereby plasticize a resin material supplied to a first space in the cylinder arranged on the side of the cylinder opposite to the side of the cylinder close to the injection part with the torpedo piston interposed therebetween, and to cause a molten resin to flow into a second space in the cylinder on the side of the cylinder close to the injection part with the torpedo piston interposed therebetween and cause the torpedo piston to be slid toward the injection part inside the cylinder to thereby inject the molten resin from the injection part, in which a pressurizing piston inserted into the torpedo piston so that it can be slid is caused to protrude toward the second space of the cylinder in such a way that an amount of increase in the volume of the second space of the cylinder becomes equal to or smaller than an amount of decrease in the volume of the first space of the cylinder when the torpedo piston moves toward the side of the cylinder opposite to the side of the cylinder close to the injection part in order to plasticize the resin material.

The above injection molding method may include causing torpedo pistons to be slid inside respective cylinders to cause a period during which the molten resin is injected from at least a first cylinder of the plurality of cylinders to overlap a period during which the molten resin is injected from a second cylinder of the plurality of cylinders for a first preset period, and continuously injecting the molten resin from the plurality of cylinders.

The above injection molding method may include causing, in each of the cylinders, a period during which the molten resin is injected to overlap a period during which the resin material is supplied to the cylinder for a second preset period.

The above injection molding method may include supplying a resin material to the first space based on the flow of gas to the first space of the cylinder.

According to the present disclosure, it is possible to provide an injection molding machine, an injection molding apparatus, and an injection molding method that contribute to improving the quality of a workpiece.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 5 is a cross-sectional view taken along the line V-V of FIG. 1;

FIG. 10 is a diagram showing an operation of the injection molding apparatus according to the first embodiment;

Figure 11:
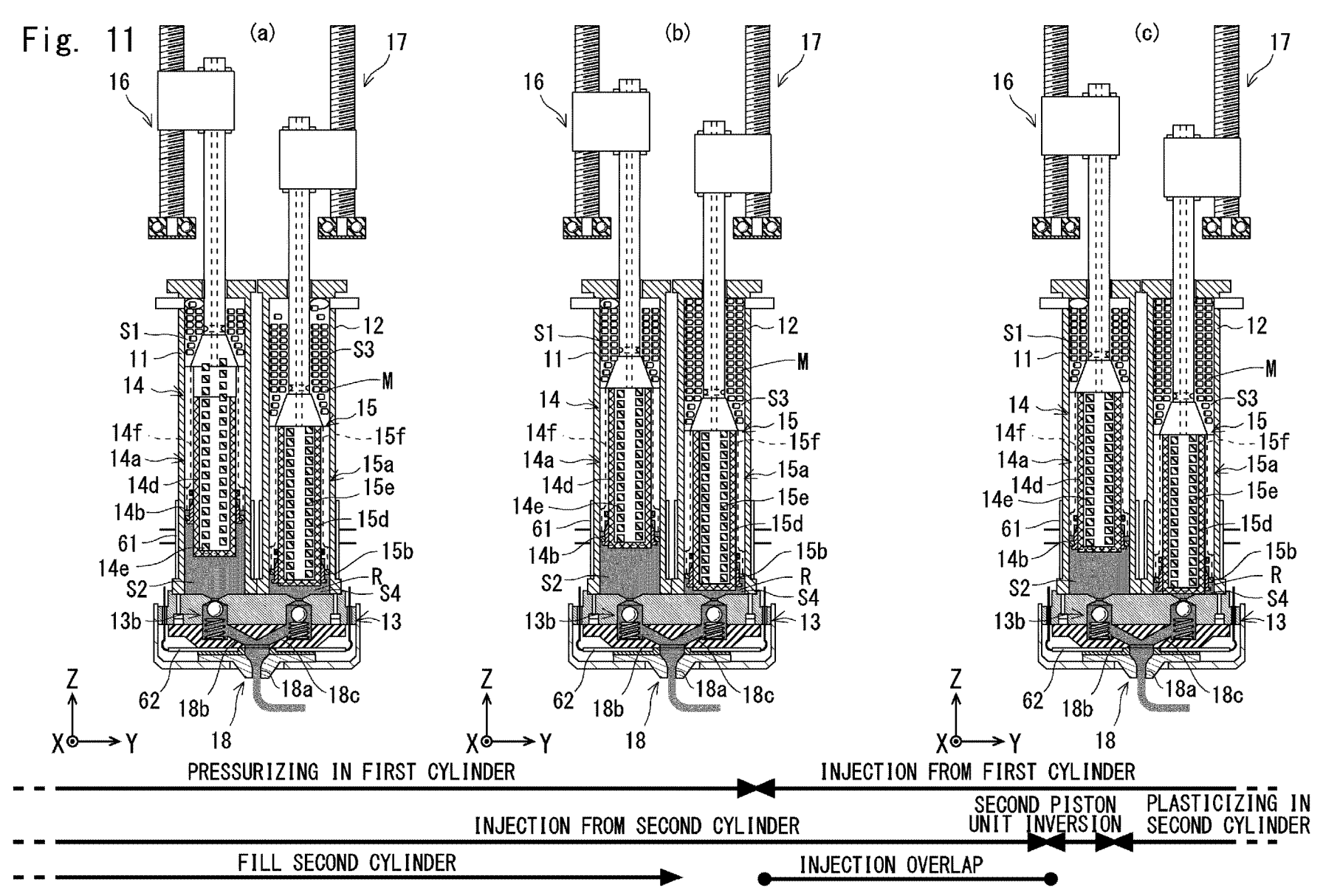

FIG. 11 is a diagram showing an operation of the injection molding apparatus according to the first embodiment;

Figure 13:
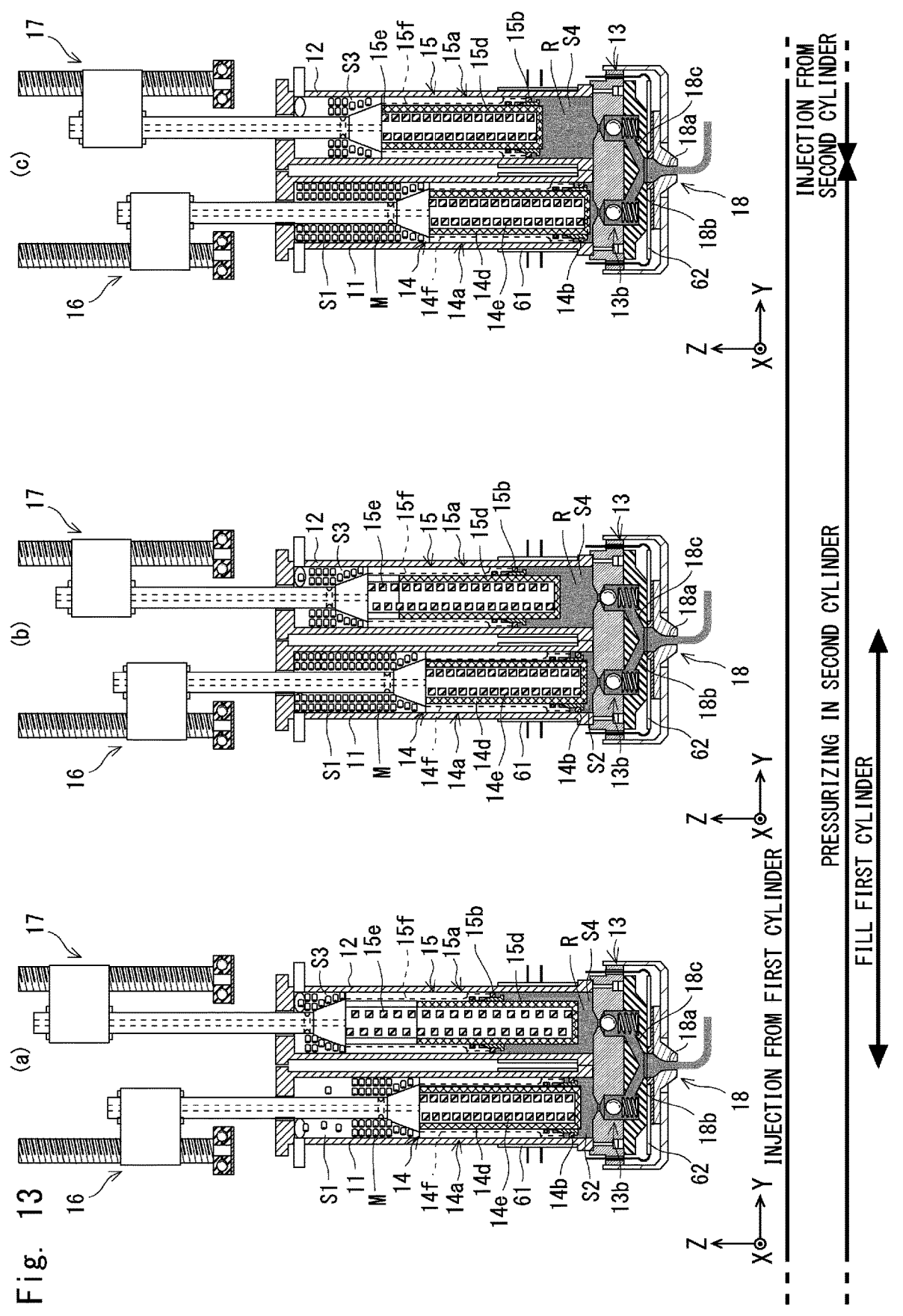

FIG. 13 is a diagram showing an operation of the injection molding apparatus according to the first embodiment;

DESCRIPTION OF EMBODIMENTS

Hereinafter, with reference to the drawings, specific embodiments to which the present disclosure is applied will be described in detail. However, the present disclosure is not limited to the following embodiments. Further, for the sake of clarification of the description, the following descriptions and the drawings are simplified as appropriate.

First Embodiment

Figure 1:
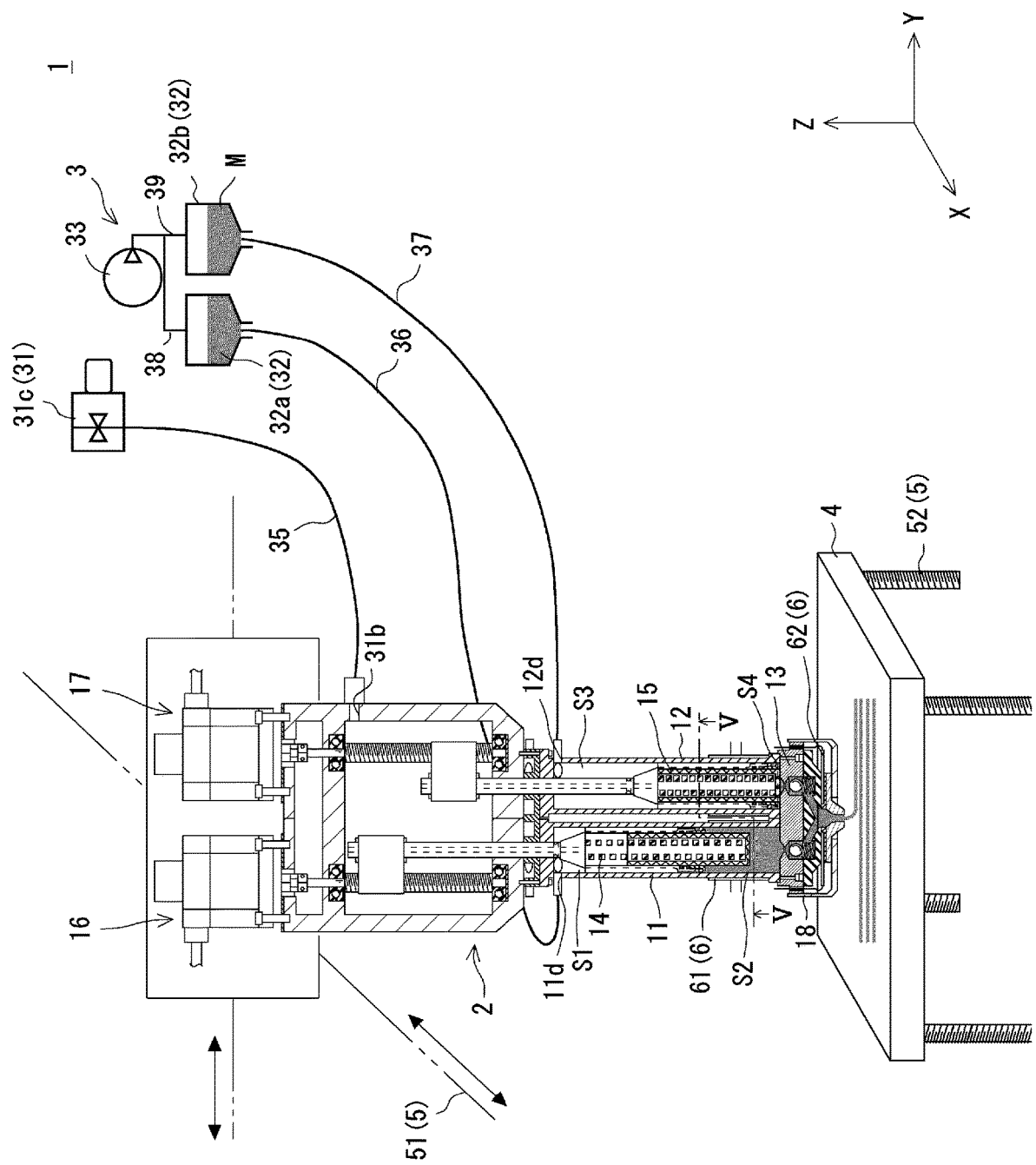
FIG. 1 is a diagram schematically showing an injection molding apparatus according to a first embodiment.
Figure 2:
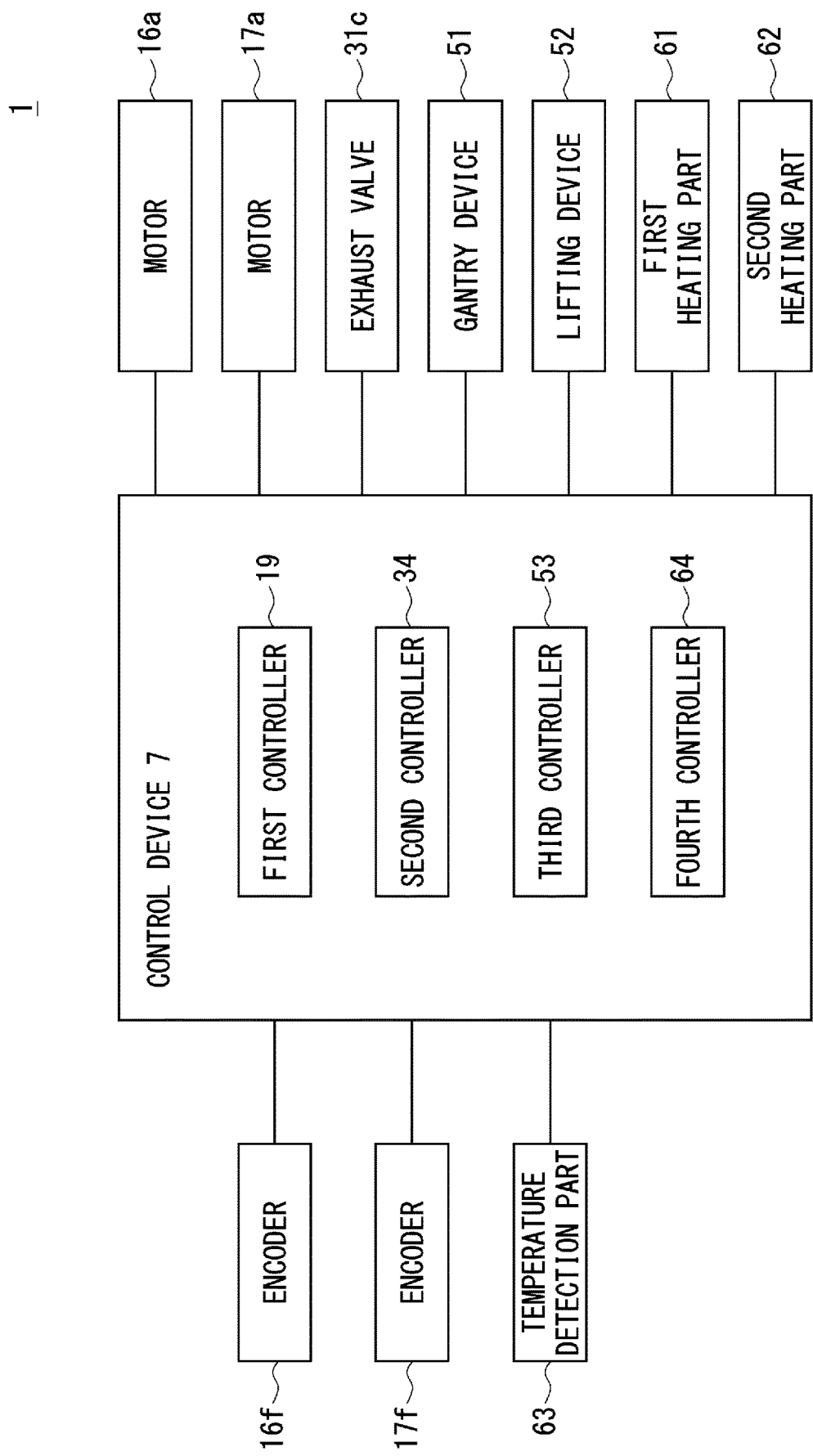
FIG. 2 is a block diagram of a control system of the injection molding apparatus according to the first embodiment.

First, a structure of an injection molding apparatus according to this embodiment will be described. The injection molding apparatus according to this embodiment is suitable for additively manufacturing a workpiece using an injection molding machine. FIG. 1 is a diagram schematically showing an injection molding apparatus according to this embodiment. FIG. 2 is a block diagram of a control system of the injection molding apparatus according to this embodiment. The following description will be given using a three-dimensional (XYZ) coordinate system for the sake of clarity of the description.

Figure 3:
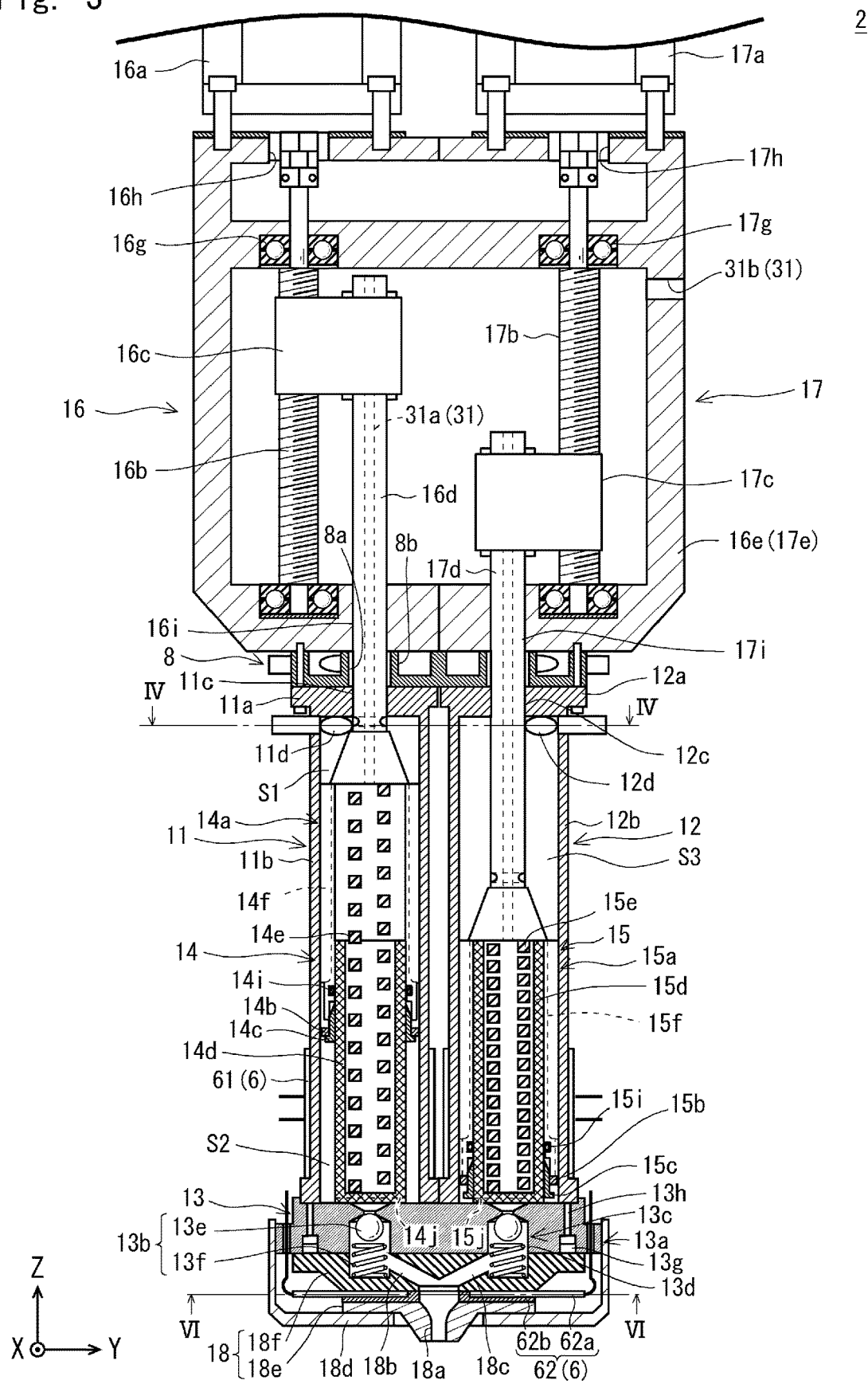
FIG. 3 is an enlarged diagram showing a part of the injection molding machine on a Z-axis negative side according to the first embodiment.
Figure 4:
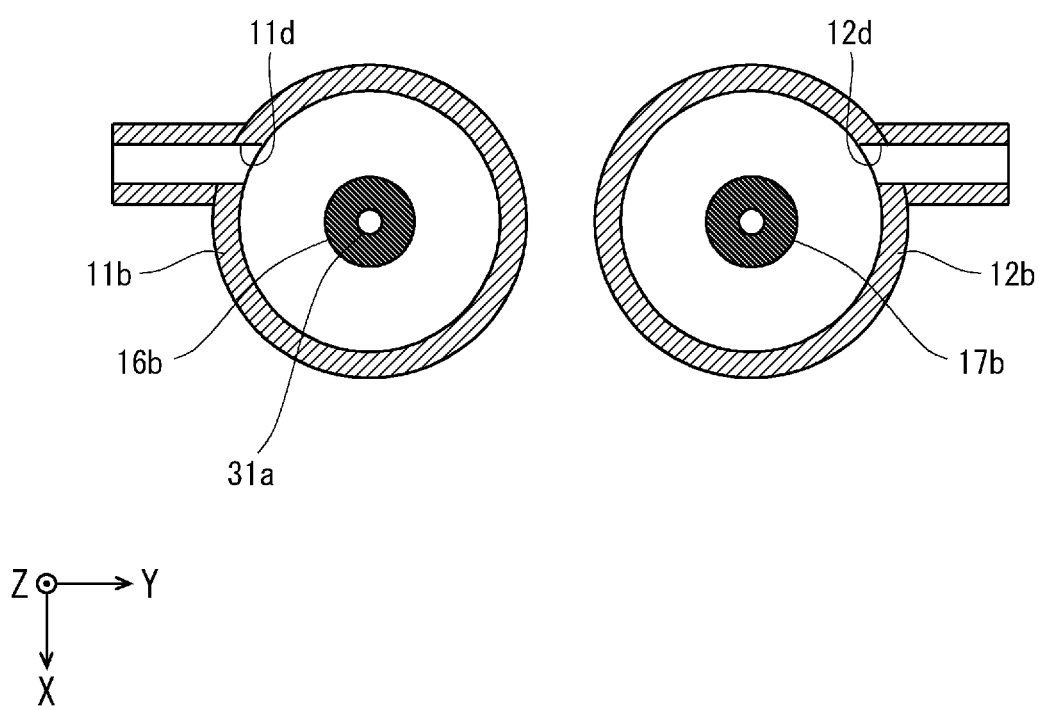
FIG. 4 is a cross-sectional view taken along the line IV-IV of FIG. 3.
Figure 6:
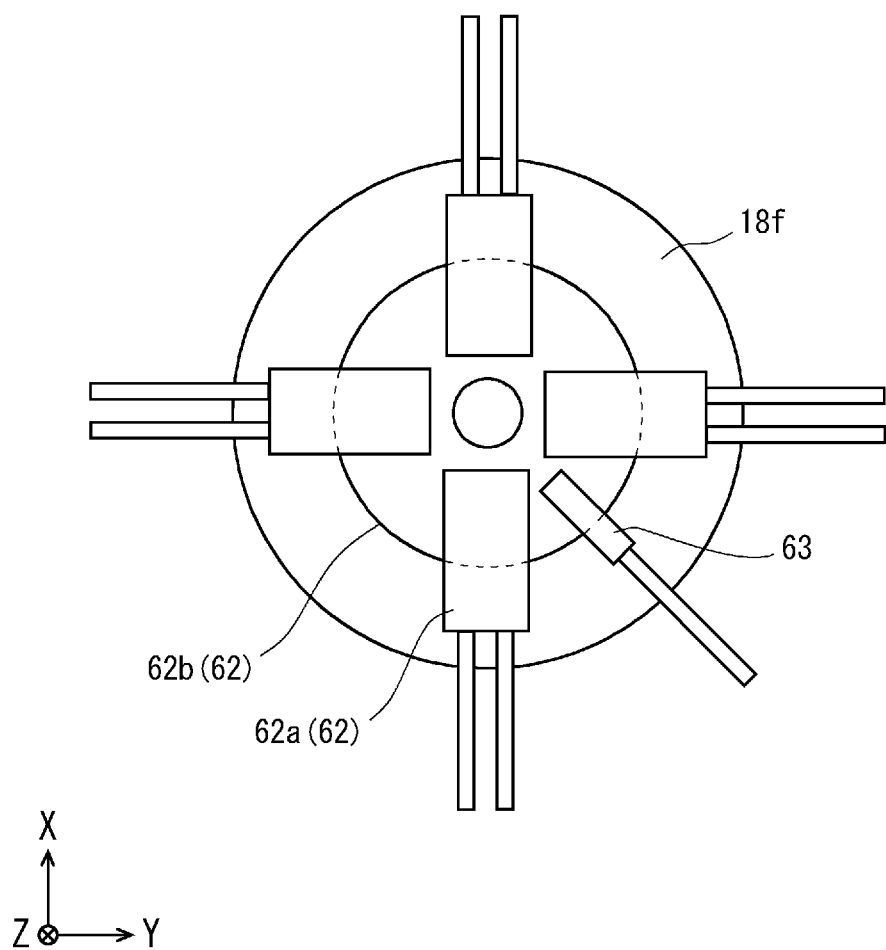
FIG. 6 is a cross-sectional view taken along the line VI-VI of FIG. 3.

As shown in FIGS. 1 and 2, an injection molding apparatus 1 includes an injection molding machine 2, a supply apparatus 3, a table 4, a moving device 5, a heating device 6, and a control device 7. The injection molding machine 2 has, for example, a structure capable of continuously injecting a molten resin. FIG. 3 is an enlarged diagram showing a part of the injection molding machine on a Z-axis negative side according to this embodiment. FIG. 4 is a cross-sectional view taken along the line IV-IV of FIG. 3. FIG. 5 is a cross-sectional view taken along the line V-V of FIG. 1. FIG. 6 is a cross-sectional view taken along the line VI-VI of FIG. 3.

As shown in FIGS. 1 to 3, the injection molding machine 2 includes a first cylinder 11, a second cylinder 12, an end plate 13, a first piston unit 14, a second piston unit 15, a first drive part 16, a second drive part 17, an injection part 18, and a first controller 19.

As shown in FIG. 3, the first cylinder 11 is extended in the Z-axis direction and has, as its basic form, a topped cylindrical shape in which the end part of the first cylinder 11 on the Z-axis positive side is blocked. That is, the first cylinder 11 includes a blocking part 11a arranged on the Z-axis positive side thereof and a cylindrical side wall part 11b that is continuous with the peripheral part of the blocking part 11a and is extended in the Z-axis negative side from the blocking part 11a, and the end part of the first cylinder 11 on the Z-axis negative side is opened. As shown in FIG. 3, a through-hole 11c that penetrates through the blocking part 11a in the Z-axis direction is formed in the blocking part 11a of the first cylinder 11. Further, as shown in FIGS. 3 and 4, a supply hole 11d through which a resin material is supplied is formed in a part of the side wall part 11b of the first cylinder 11 on the Z-axis positive side.

As shown in FIGS. 3 and 4, the second cylinder 12 is extended in the Z-axis direction and is aligned with the first cylinder 11 in the Y-axis direction. Since the second cylinder 12 has a structure equal to that of the first cylinder 11, the redundant descriptions thereof will be omitted. The second cylinder 12 includes a blocking part 12a including a through-hole 12c and a side wall part 12b including a supply hole 12d, and the end part of the second cylinder 12 on the Z-axis negative side is opened.

As shown in FIG. 3, the end plate 13 is fixed to the end part of each of the first cylinder 11 and the second cylinder 12 on the Z-axis negative side. The end plate 13 includes a body part 13a and a non-return valve 13b. The body part 13a has, for example, a plate shape as its basic form, and includes through-holes 13c at intervals therebetween in the Y-axis direction.

As shown in FIG. 3, the through-holes 13c penetrate through the body part 13a in the Z-axis direction, and each include an accommodation part 13d that accommodates the non-return valve 13b in a part of the through-hole 13c on the Z-axis negative side. The surface of the accommodation part 13d on the Z-axis positive side is an inclined surface that is inclined in the Z-axis negative side from the center of the through-hole 13c toward the outside thereof.

Note that the part of the through-hole 13c on the Z-axis positive side may include an inclined surface that is inclined in the Z-axis positive side from the center of the through-hole 13c toward the outside thereof, and the end part of the inclined surface on the Z-axis negative side may be continuous with the end part of the accommodation part 13d on the Z-axis positive side.

The non-return valve 13b allows a molten resin to flow toward the Z-axis negative side and interrupts the flow of the molten resin toward the Z-axis positive side. The non-return valve 13b may be formed of, for example, a check valve, and includes a check ball 13e and a spring 13f, as shown in FIG. 3. An elastic force of the spring 13f may be set as appropriate in such a way that the non-return valve 13b is opened when a preset pressure is acted on the check ball 13e.

As shown in FIG. 3, the above end plate 13 is fixed to the end part of each of the first cylinder 11 and the second cylinder 12 on the Z-axis negative side via bolts 13h that are made to pass through bolt holes 13g formed in the body part 13a so as to cover an open port of the first cylinder 11 on the Z-axis negative side and an open port of the second cylinder 12 on the Z-axis negative side in the end plate 13.

Note that the through-hole 13c on the Y-axis negative side in the end plate 13 is arranged on the Z-axis negative side with respect to the first cylinder 11 and the through-hole 13c on the Y-axis positive side in the end plate 13 is arranged on the Z-axis negative side with respect to the second cylinder 12.

Preferably, the central axis of the through-hole 13c on the Y-axis negative side in the end plate 13 may substantially overlap the central axis of the first cylinder 11 and the central axis of the through-hole 13c on the Y-axis positive side in the end plate 13 may substantially overlap the central axis of the second cylinder 12.

Figure 7:
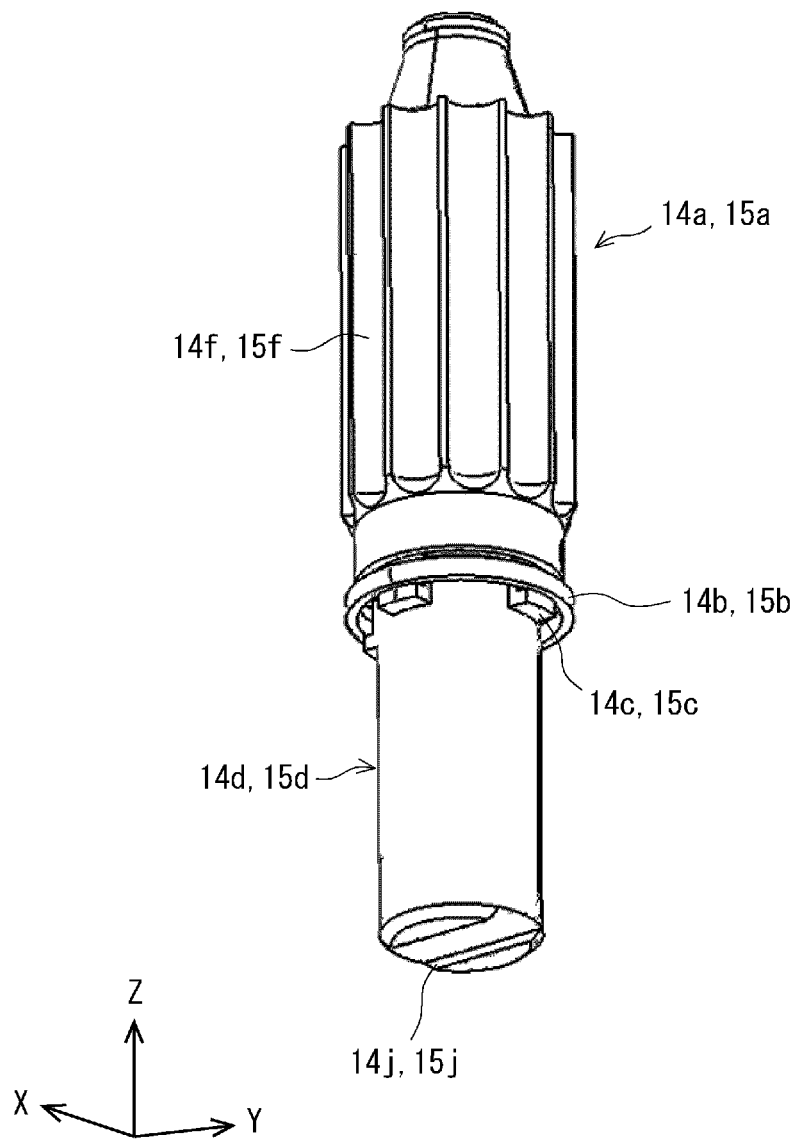
FIG. 7 is a perspective view showing a first piston unit and a second piston unit according to the first embodiment.
Figure 8:
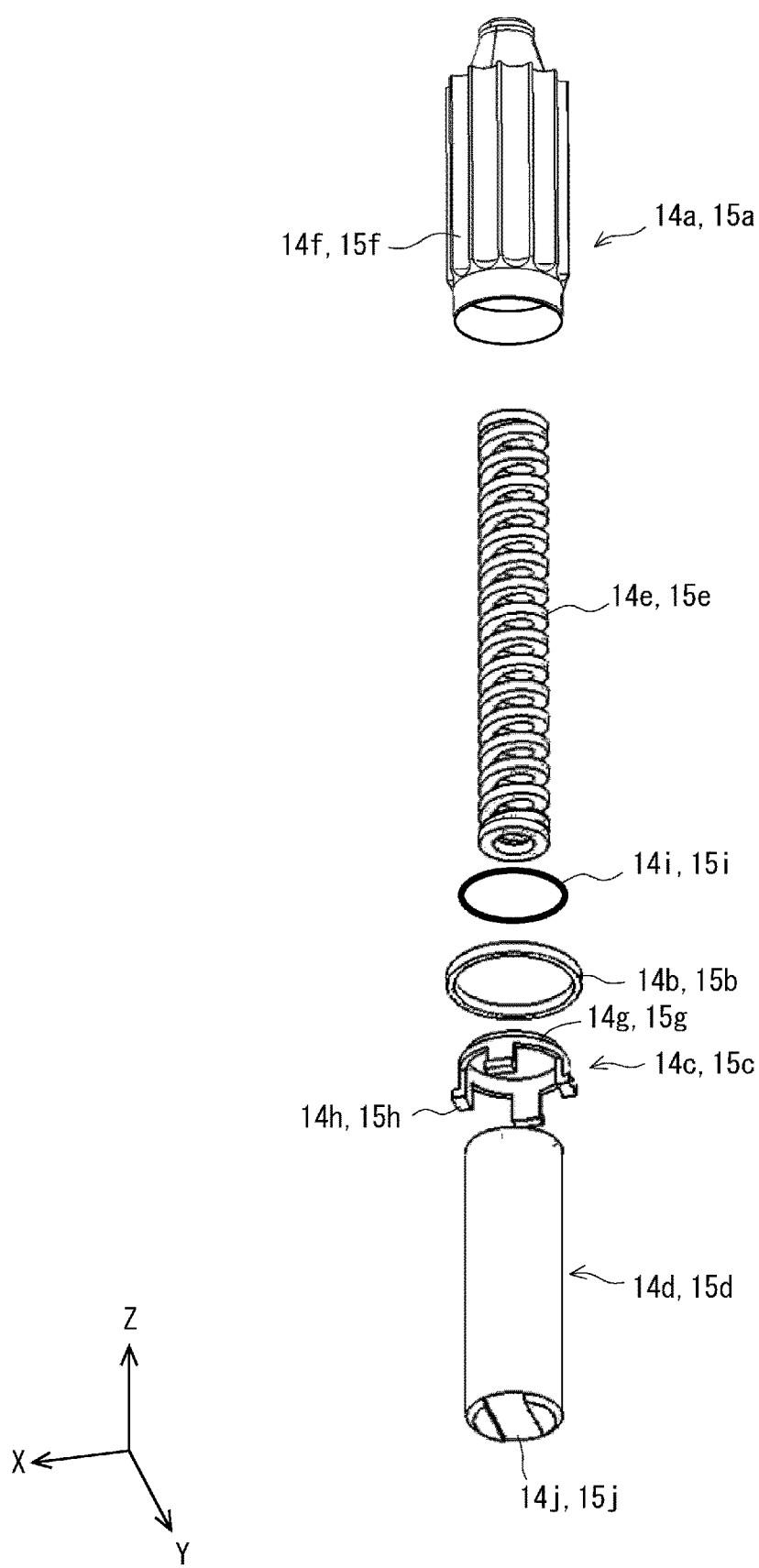
FIG. 8 is an exploded view showing the first piston unit and the second piston unit according to the first embodiment.
Figure 9:
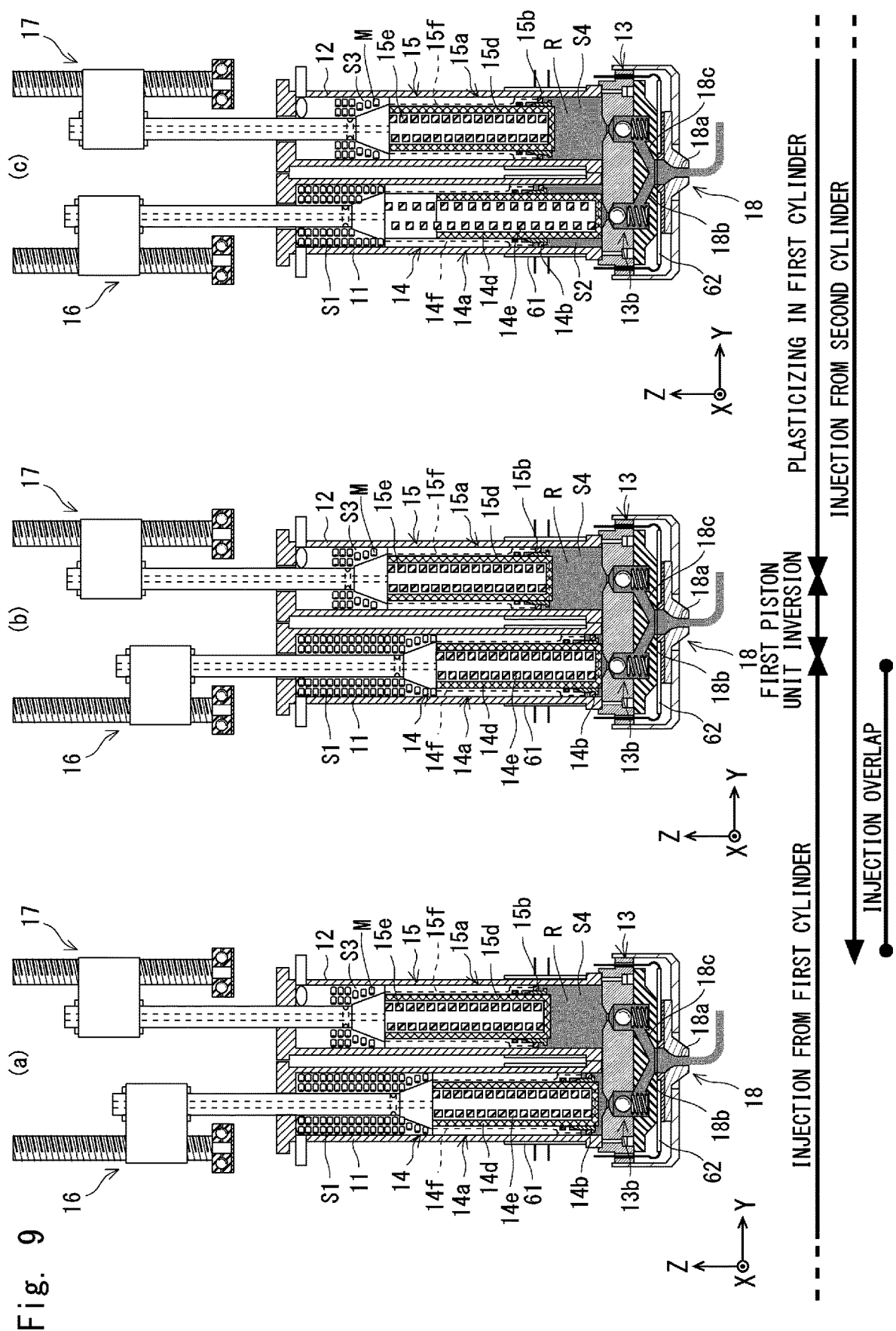
FIG. 9 is a diagram showing an operation of the injection molding apparatus according to the first embodiment.
Figure 12:
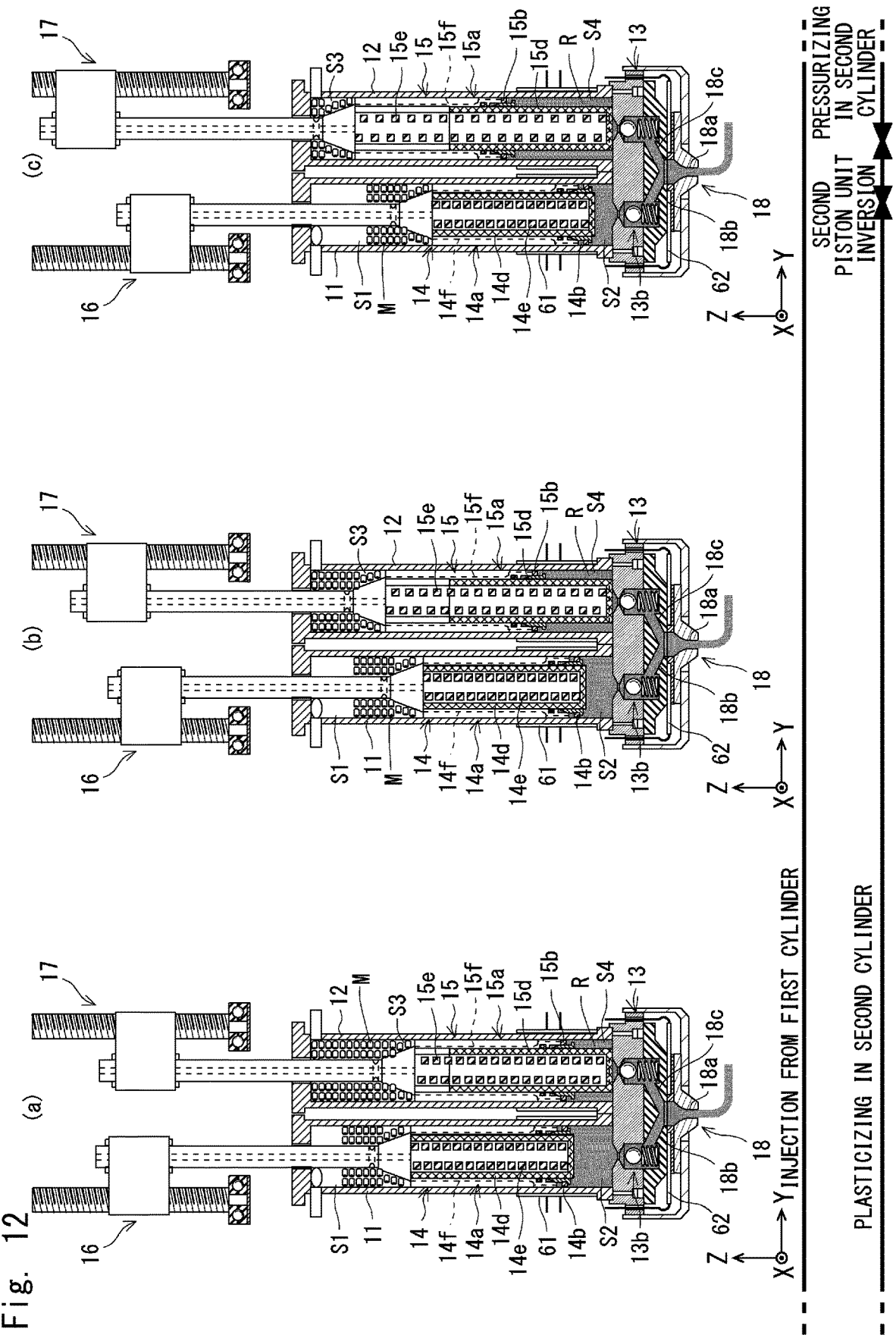
FIG. 12 is a diagram showing an operation of the injection molding apparatus according to the first embodiment.

As shown in FIG. 3, the first piston unit 14 is arranged inside the first cylinder 11 in such a way that the first piston unit 14 can be slid inside the first cylinder 11. FIG. 7 is a perspective view showing the first and second piston units according to this embodiment. FIG. 8 is an exploded view showing the first and second piston units according to this embodiment.

As shown in FIGS. 7 and 8, the first piston unit 14 includes a torpedo piston 14a, a non-return ring 14b, a stopper 14c, a pressurizing piston 14d, and energizing means 14e. The torpedo piston 14a, which has, as its basic form, a topped cylindrical shape in which the end part of the torpedo piston 14a on the Z-axis positive side is blocked, roughly has an outer circumferential shape that corresponds to the inner circumferential shape of the first cylinder 11. At this time, the surface of the torpedo piston 14a on the Z-axis positive side is preferably an inclined surface that is inclined toward the Z-axis negative side from the center of the torpedo piston 14a toward the peripheral part thereof.

As shown in FIGS. 7 and 8, groove parts 14f are formed on an outer circumferential surface of the torpedo piston 14a. The groove parts 14f, which are extended in the Z-axis direction, are arranged at approximately equal intervals in the circumferential direction of the torpedo piston 14a.

As will be described later, the groove parts 14f may have such a shape and an arrangement that it is possible to plasticize, when the resin material supplied to a first space S1 in the first cylinder 11 on the Z-axis positive side with respect to the first piston unit 14 passes through the groove parts 14f, the resin material to obtain a molten resin, thereby allowing the molten resin to flow into a second space S2 in the first cylinder 11 on the Z-axis negative side with respect to the first piston unit 14.

As shown in FIGS. 5, 7, and 8, the non-return ring 14b, which has a ring shape having an outer circumferential shape that is substantially equal to the inner circumferential shape of the first cylinder 11, is arranged on the Z-axis negative side with respect to the torpedo piston 14a. The stopper 14c holds the non-return ring 14b in the end part of the torpedo piston 14a on the Z-axis negative side.

As shown in FIG. 8, for example, the stopper 14c includes a ring part 14g and hook parts 14h. The ring part 14g has an outer circumferential shape that is substantially equal to the inner circumferential shape of the torpedo piston 14a. Each of the hook parts 14h has a substantially L shape when it is seen from the direction perpendicular to the Z axis, and the end part of the vertical part of the hook part 14h on the Z-axis positive side is fixed to the ring part 14g.

As shown in FIG. 8, the horizontal part of the hook part 14h protrudes toward the outside of the ring part 14g from the end part of the vertical part of the hook part 14h on the Z-axis negative side. The hook parts 14h are arranged at approximately equal intervals in the circumferential direction of the ring part 14g.

In a state in which the ring part 14g and the vertical parts of the hook parts 14h are made to pass through the through-hole of the non-return ring 14b, the ring part 14g is fit into the open port of the end part of the torpedo piston 14a on the Z-axis negative side. Accordingly, the non-return ring 14b is held in the end part of the torpedo piston 14a on the Z-axis negative side via the stopper 14c.

Note that the length of the vertical parts of the hook parts 14h in the Z-axis direction is larger than the thickness of the non-return ring 14b in the Z-axis direction. Accordingly, the non-return ring 14b is movable in the Z-axis direction between the end part of the first cylinder 11 on the Z-axis negative side and the horizontal part of the hook parts 14h. It is sufficient, however, that the stopper 14c have a structure capable of holding the non-return ring 14b in the end part of the first cylinder 11 on the Z-axis negative side in such a way that the non-return ring 14b is movable in the Z-axis direction.

As shown in FIGS. 7 and 8, the pressurizing piston 14d has a bottomed cylindrical shape in which the end part of the pressurizing piston 14d on the Z-axis negative side is blocked, and the end surface of the pressurizing piston 14d on the Z-axis negative side is, for example, a substantially flat surface that is parallel to the XY plane. The outer circumferential shape of the pressurizing piston 14d is substantially equal to the inner circumferential shape of the torpedo piston 14a.

As shown in FIG. 3, the pressurizing piston 14d is inserted inside the torpedo piston 14a so that the pressurizing piston 14d can be slid in a state in which the inner circumferential surface of the torpedo piston 14a and the outer circumferential surface of the pressurizing piston 14d are blocked by a seal member 14i.

That is, the inside of the torpedo piston 14a functions as a sliding part of the pressurizing piston 14d, and the pressurizing piston 14d is slid in the Z-axis direction with respect to the torpedo piston 14a, whereby an amount of protrusion into a second space S2 of the first cylinder 11 with respect to the torpedo piston 14a is changed. The area of the region surrounded by the outer periphery of the pressurizing piston 14d, a maximum movement amount and the like will be described later.

As shown in FIGS. 7 and 8, an enter part 14j which the molten resin enters may be formed on the end surface of the pressurizing piston 14d on the Z-axis negative side, while the detailed functions thereof will be described later. The enter part 14j, which is, for example, a groove part formed on the end surface of the pressurizing piston 14d on the Z-axis negative side, is extended in the direction that is perpendicular to the Z axis.

Note that it is sufficient that the enter part 14j have such a shape that it allows the molten resin to enter the space between the end surface of the pressurizing piston 14d on the Z-axis negative side and the end part of the end plate 13 on the Z-axis positive side in a state in which the end surface of the pressurizing piston 14d on the Z-axis negative side is in contact with the end part of the end plate 13 on the Z-axis positive side.

The energizing means 14e energizes the pressurizing piston 14d toward the second space S2 of the first cylinder 11 with respect to the torpedo piston 14a. As shown in FIG. 8, the energizing means 14e is, for example, an elastic member such as a coil spring.

The energizing means 14e is arranged inside the pressurizing piston 14d in a state in which the end part of the energizing means 14e on the Z-axis positive side is in contact with the end part of the torpedo piston 14a on the Z-axis positive side and the end part of the energizing means 14e on the Z-axis negative side is in contact with the end part of the pressurizing piston 14d on the Z-axis negative side. Note that the energizing force and the like of the energizing means 14e will be described later.

As shown in FIG. 3, the second piston unit 15 is arranged inside the second cylinder 12 in such a way that the second piston unit 15 can be slid inside the second cylinder 12. Since the second piston unit 15 has a structure the same as that of the first piston unit 14, the redundant descriptions thereof will be omitted. As shown in FIGS. 5, 7, and 8, the second piston unit 15 includes a torpedo piston 15a having an outer circumferential surface in which groove parts 15f are formed, a non-return ring 15b, a stopper 15c including a ring part 15g and hook parts 15h, a pressurizing piston 15d, and energizing means 15e.

As shown in FIG. 3, the pressurizing piston 15d is inserted inside the torpedo piston 15a so that the pressurizing piston 15d can be slid in a state in which the inner circumferential surface of the torpedo piston 15a and the outer circumferential surface of the pressurizing piston 15d are blocked by a seal member 15i. At this time, as shown in FIGS. 5, 7, and 8, an enter part 15j which the molten resin enters may be formed on the end surface of the pressurizing piston 15d on the Z-axis negative side as well.

The first drive part 16 drives the first piston unit 14 in the Z-axis direction. As shown in FIG. 3, the first drive part 16 includes a motor 16a, a screw shaft 16b, a slider 16c, a rod 16d, and a case 16e. The motor 16a, which is, for example, a servo motor, is fixed to an end part of the case 16e on the Z-axis positive side. The rotation angle of the output shaft of the motor 16a is detected by an encoder 16f (see FIG. 2).

As shown in FIG. 3, the screw shaft 16b is extended in the Z-axis direction and is rotatably supported via a bearing 16g inside the case 16e. Then, the end part of the screw shaft 16b on the Z-axis positive side is connected to the output shaft of the motor 16a so as to be able to transmit a drive force from the output shaft of the motor 16a in a state in which the end part of the screw shaft 16b on the Z-axis positive side is made to pass through a through-hole 16h formed in the end part of the case 16e on the Z-axis positive side.

The slider 16c includes a screw hole and the screw hole of the slider 16c is engaged with the screw shaft 16b in such a way that the slider 16c moves along the screw shaft 16b inside the case 16e. The screw shaft 16b and the slider 16c form a ball screw and are accommodated inside the case 16e.

As shown in FIG. 3, the rod 16d is extended in the Z-axis direction, and is made to pass through a through-hole 16i formed in the end part of the case 16e on the Z-axis negative side and a through-hole 11c of the first cylinder 11. The end part of the rod 16d on the Z-axis positive side is fixed to the slider 16c and the end part of the rod 16d on the Z-axis negative side is fixed to the end part of the torpedo piston 14a of the first piston unit 14 on the Z-axis positive side.

As shown in FIG. 3, the case 16e supports the motor 16a, the screw shaft 16b, the slider 16c, and the rod 16d. The case 16e has, for example, a box shape, and forms a closed space inside the case 16e. The blocking part 11a of the first cylinder 11 is fixed to the end part of the case 16e on the Z-axis negative side.

The second drive part 17 drives the second piston unit 15 in the Z-axis direction. Since the second drive part 17 has a structure substantially equal to that of the first drive part 16, the redundant descriptions thereof will be omitted. As shown in FIG. 3, the second drive part 17 includes a motor 17a, a screw shaft 17b, a slider 17c, a rod 17d, and a case 17e.

That is, the motor 17a is fixed to the end part of the case 17e on the Z-axis positive side, and the rotation angle of the output shaft of the motor 17a is detected by an encoder 17f (see FIG. 2). As shown in FIG. 3, the screw shaft 17b is supported inside the case 17e via a bearing 17g, and the end part of the screw shaft 17b on the Z-axis positive side is connected to the output shaft of the motor 17a in a state in which the screw shaft 17b is made to pass through a through-hole 17h formed in the end part of the case 17e on the Z-axis positive side.

The screw hole of the slider 17c is engaged with the screw shaft 17b in such a way that the slider 17c moves along the screw shaft 17b inside the case 17e. The rod 17d is made to pass through a through-hole 17i formed in the end part of the case 17e on the Z-axis negative side and the through-hole 12c of the second cylinder 12. Then, the end part of the rod 17d on the Z-axis positive side is fixed to the slider 17c, and the end part of the rod 17d on the Z-axis negative side is fixed to the end part of the torpedo piston 15a of the second piston unit 15 on the Z-axis positive side.

As shown in FIG. 3, the case 17e supports the motor 17a, the screw shaft 17b, the slider 17c, and the rod 17d, and forms a closed space inside the case 17e. Then the blocking part 12a of the second cylinder 12 is fixed to the end part of the case 17e on the Z-axis negative side.

As shown in FIGS. 1 and 3, in this embodiment, the case 17e is integrally formed with the case 16e of the first drive part 16, thereby forming a common closed space. Therefore, in the following description, when the case 16e of the first drive part 16 is indicated, the case 17e of the second drive part 17 may be indicated as well. Note that the case 17e may be formed of a member that is different from that of the case 16e of the first drive part 16.

The injection part 18 is arranged on the Z-axis negative side with respect to the end plate 13 in such a way that the injection part 18 is able to inject the molten resin extruded from the first cylinder 11 and the second cylinder 12. As shown in FIG. 3, the injection part 18 includes an outlet 18a that injects the molten resin, a first branch path 18b that is extended in the Z-axis positive side and the Y-axis negative side from the outlet 18a, and a second branch part 18c that is extended in the Z-axis positive side and the Y-axis positive side from the outlet 18a. The outlet 18a preferably has such a shape that is narrowed toward the Z-axis negative side.

As shown in FIG. 3, the injection part 18 is fixed to the end plate 13 via retaining nuts 18d. At this time, the end part of the first branch path 18b on the Z-axis positive side communicates with the through-hole 13c in the end plate 13 on the Y-axis negative side, and the end part of the second branch path 18c on the Z-axis positive side communicates with the through-hole 13c in the end plate 13 on the Y-axis positive side.

The injection part 18 is divided into a first plate 18e where the outlet 18a is formed and a second plate 18f where the first branch path 18b and the second branch path 18c are formed. While the detailed functions thereof will be described later, at least one of the first plate 18e and the second plate 18f is preferably formed of a ceramic plate. The injection part 18 may be provided with an accommodation part that accommodates a part of the non-return valve 13b.

While the details of the first controller 19 will be described later, the first controller 19 controls the motor 16a of the first drive part 16 and the motor 17a of the second drive part 17 based on the results of detection in the encoders 16f and 17f.

The supply apparatus 3 supplies the resin material to the first cylinder 11 and the second cylinder 12. As shown in FIGS. 1 to 3, the supply apparatus 3 includes an exhaust part 31, a hopper 32, a pressurizing part 33, and a second controller 34. The exhaust part 31 discharges gas from the first space S1 of the first cylinder 11, the first space S3 of the second cylinder 12 on the Z-axis positive side with respect to the second piston unit 15, and the space surrounded by the torpedo pistons 14a and 15a and the pressurizing pistons 14d and 15d.

More specifically, the exhaust part 31 includes an exhaust path 31a, an exhaust hole 31b, and an exhaust valve 31c. As shown in FIG. 3, the exhaust path 31a is formed in each of the rod 16d of the first drive part 16 and the torpedo piston 14a, and the rod 17d of the second drive part 17 and the torpedo piston 15a. The exhaust paths 31a pass inside the respective rods 16d and 17d, penetrate through end parts of the respective torpedo pistons 14a and 15a on the Z-axis positive side, and are extended in the Z-axis direction.

The end parts of the exhaust paths 31a on the Z-axis negative side are branched, and reach the peripheral surfaces of the end parts of the respective rods 16d and 17d on the Z-axis negative side and reach a space surrounded by the torpedo pistons 14a and 15a and the pressurizing pistons 14d and 15d, and the end parts of the exhaust paths 31a on the Z-axis positive side reach the end surfaces of the respective rods 16d and 17d on the Z-axis positive side.

Therefore, the end parts of the exhaust path 31a on the Z-axis negative side communicate with the first space S1 of the first cylinder 11 and a space surrounded by the torpedo piston 14a and the pressurizing piston 15d or the first space S3 of the second cylinder 12 and a space surrounded by the torpedo piston 15a and the pressurizing piston 15d, and the end parts of the exhaust paths 31a on the Z-axis positive side are arranged inside the case 16e of the first drive part 16.

The exhaust hole 31b is formed in the case 16e of the first drive part 16. However, when the case 16e of the first drive part 16 and the case 17e of the second drive part 17 are made of members different from each other, the exhaust hole 31b is formed in each of the cases 16e and 17e. The exhaust valve 31c is connected to the exhaust hole 31b via the exhaust pipe 35. The exhaust valve 31c is, for example, a magnetic valve.

The hopper 32 accommodates a resin material M to be supplied to the first space S1 of the first cylinder 11 and the first space S3 of the second cylinder 12. As shown in FIG. 1, in this embodiment, a first hopper 32a and a second hopper 32b are provided as the hopper 32.

The first hopper 32a, which has a structure capable of sealing inside the first hopper 32a, is connected to the supply hole 11d of the first cylinder 11 via a first supply pipe 36. The second hopper 32b, which has a structure capable of sealing inside the second hopper 32b, is connected to the supply hole 12d of the second cylinder 12 via a second supply pipe 37.

The first hopper 32a and the second hopper 32b may each have a structure in which the resin material M can be kept dry by a pre-heater. Accordingly, it is possible to prevent molding defects caused by water vapor that is generated when the resin material M is plasticized.

Further, the inner diameters of the supply hole 11d of the first cylinder 11, the supply hole 12d of the second cylinder 12, the first supply pipe 36, and the second supply pipe 37 may be equal to or less than twice the diagonal of a resin pellet, which is the resin material M.

Accordingly, it is possible to prevent the resin material M from lining up and bridging in the supply hole 11d of the first cylinder 11, the supply hole 12d of the second cylinder 12, the first supply pipe 36 and the second supply pipe 37 and to prevent the inside thereof from being blocked.

The pressurizing part 33 is an air pump that pressurizes the inside of the hopper 32 with gas. As shown in FIG. 1, in this embodiment, the pressurizing part 33 is connected to the first hopper 32a via a first connecting pipe 38 and is also connected to the second hopper 32b via a second connecting pipe 39.

For example, the pressurizing part 33 constantly pressurizes inside the hopper 32. Therefore, in a state in which the exhaust valve 31c and the non-return valve 13b of the end plate 13 are closed, a closed space formed of the first cylinder 11, the second cylinder 12, the space surrounded by the torpedo pistons 14a and 15a and the pressurizing pistons 14d and 15d, and the case 16e of the first drive part 16 is maintained to have a pressure higher than that in the outside of the case 16e.

The second controller 34 controls the exhaust valve 31c in order to discharge gas from the first space S1 of the first cylinder 11 or the first space S3 of the second cylinder 12 at a desired timing that will be described later.

As shown in FIG. 1, the table 4 is a molding table that is arranged on the Z-axis negative side with respect to the injection molding machine 2 and is used for laminating the molten resin injected from the injection molding machine 2 to mold a workpiece. The table 4 may be, for example, configured to be heatable. The moving device 5 moves the injection molding machine 2 and the table 4 in order to mold a workpiece. The moving device 5 includes, as shown in FIGS. 1 and 2, for example, a gantry device 51, a lifting device 52, and a third controller 53.

The gantry device 51 moves the injection molding machine 2 in the X-axis direction and the Y-axis direction. The gantry device 51 may be a general gantry device, and may be formed, for example, by combining a slide rail that is extended in the X-axis direction with a slide rail that is extended in the Y-axis direction.

The lifting device 52 raises or lowers the table 4 in the Z-axis direction. The lifting device 52, which may be, for example, a general lifting device, may be made of ball screws. The third controller 53 controls the gantry device 51 and the lifting device 52 in order to laminate the molten resin injected from the injection molding machine 2 and mold a desired workpiece.

As shown in FIGS. 1 to 3, the heating device 6 includes a first heating part 61, a second heating part 62, a temperature detection part 63, and a fourth controller 64. The first heating part 61 maintains the temperature of the plasticized molten resin.

The first heating part 61 may be formed of, for example, a seat heater that surrounds a part of the first cylinder 11 and the second cylinder 12 on the Z-axis negative side. Note that it is sufficient that the first heating part 61 be able to heat the plasticized molten resin, and the structure and the arrangement of the first heating part 61 are not limited.

The second heating part 62 heats the molten resin to a desired temperature. As shown in FIGS. 3 and 6, for example, the second heating part 62 includes seat heaters 62a and a heat-transfer member 62b. The seat heaters 62a are arranged at approximately equal intervals around the outlet 18a of the injection part 18 when it is seen from the Z-axis direction. The heat-transfer member 62b, which has a disc shape having a through-hole formed at substantially the center of the heat-transfer member 62b, is formed of a ceramic plate.

The heat-transfer member 62b is arranged between the first plate 18e and the second plate 18f. In this case, the seat heater 62a is arranged between the heat-transfer member 62b and the first plate 18e or between the heat-transfer member 62b and the second plate 18f. Accordingly, the heat in the seat heater 62a can be properly transmitted to the first plate 18e or the second plate 18f.

When the first plate 18e and the second plate 18f are each formed of a ceramic plate, as described above, since a ceramic plate has a smaller heat capacity than metal does, the heat in the second heating part 62 can be efficiently transmitted to the molten resin. Further, when the second heating part 62 is damaged, it may be replaced by a new one in a simple manner by loosening the retaining nuts 18d.

The temperature detection part 63 detects the temperature of the molten resin. The temperature detection part 63 is provided, for example, in the injection part 18. In this case, the temperature detection part 63 may be provided in the first plate 18e or the second plate 18f that is formed of a ceramic plate. Accordingly, it is possible to detect the temperature of the molten resin with a high accuracy.

The fourth controller 64 controls the first heating part 61 and the second heating part 62 in such a way that the temperature of the molten resin falls within a preset range based on the results of the detection in the temperature detection part 63. When the first cylinder 11 and the second cylinder 12 are configured to be able to maintain the temperature of the molten resin R, the heating device 6 may not be provided.

As shown in FIG. 2, the control device 7 includes the first controller 19, the second controller 34, the third controller 53, and the fourth controller 64, and controls the first controller 19, the second controller 34, the third controller 53, and the fourth controller 64 in order to mold a workpiece.

Next, preferable conditions for preventing gas from flowing into the second space S2 of the first cylinder 11 or a second space S4 of the second cylinder 12 when the molten resin is made to flow into the second space S2 of the first cylinder 11 or the second space S4 of the second cylinder 12 on the Z-axis negative side with respect to the second piston unit 15 while plasticizing the resin material M supplied to the first space S1 of the first cylinder 11 or the first space S3 of the second cylinder 12 in the injection molding apparatus 1 according to this embodiment will be described.

First, the area of the region surrounded by the outer periphery in the XY cross section in the pressurizing piston 14d of the first piston unit 14 is preferably equal to or larger than the area of the region surrounded by the outer periphery in the XY cross section in the rod 16d. Likewise, the area of the region surrounded by the outer periphery in the XY cross section in the pressurizing piston 15d of the second piston unit 15 is preferably equal to or larger than the area of the region surrounded by the outer periphery in the XY cross section in the rod 17d.

Then, the volume of the second space S2 in a state in which the torpedo piston 14a is arranged in the farthest place of the Z-axis positive side in order to inject the molten resin and the pressurizing piston 14d is arranged in the second space S2 of the first cylinder 11 is preferably equal to or smaller than the volume of the first space S1 in a state in which the torpedo piston 14a is arranged in the farthest place of the Z-axis negative side in order to plasticize the resin material M and the rod 16d is arranged in the first space S1 of the first cylinder 11. Likewise, the volume of the second space S4 in a state in which the torpedo piston 15a is arranged in the farthest place of the Z-axis positive side in order to inject the molten resin and the pressurizing piston 15d is arranged in the second space S4 of the second cylinder 12 is preferably equal to or smaller than the volume of the first space S3 in a state in which the torpedo piston 15a is arranged in the farthest place of the Z-axis negative side in order to plasticize the resin material M and the rod 17d is arranged in the first space S3 of the second cylinder 12.

Further, the following <Expression 1> to <Expression 3> are preferably satisfied.

$$(\pi \times (Dc^2 - Dr^2) \times Lr \times \gamma)/4 \geq (\pi \times (Dc^2 - Dp^2) \times Lr)/4 \quad \text{<Expression 1>}$$

$$\pi \times Lr \times \{(Dc^2 - Dr^2) \times \gamma - (Dc^2 - Dp^2)\}/4 \leq \pi \times Dp^2 \times Lp/4 \quad \text{<Expression 2>}$$

$$(Dc^2 - Dp^2)/(Dc^2 - Dr^2) \leq \gamma \leq Dp^2/(Dc^2 - Dr^2) \times Lp/Lr + (Dc^2 - Dp^2)/(Dc^2 - Dr^2) \quad \text{<Expression 3>}$$

In the above expressions, Dc denotes an inner diameter of each of the first cylinder 11 and the second cylinder 12, Dp denotes an outer diameter of each of the pressurizing pistons 14d and 15d, Dr denotes an outer diameter of each of the rods 16d and 17d, Lp denotes the maximum stroke amount (maximum movement amount) of each of the pressurizing pistons 14d and 15d, Lr denotes the maximum stroke amount (maximum movement amount) of each of the torpedo pistons 14a and 15a, and $\gamma$ denotes the filling rate of the resin material M.

As shown in <Expression 1>, the volume of the resin material M supplied to the first space S1 of the first cylinder 11 or the first space S3 of the second cylinder 12 is preferably equal to or larger than the amount of increase in the volume of the second space S2 of the first cylinder 11 or the second space S4 of the second cylinder 12 when the resin material M is plasticized.

The volume of the resin material M is substantially equal to the volume of the molten resin. Therefore, it can also be said that the volume of the molten resin that flows into the second space S2 of the first cylinder 11 or the second space S4 of the second cylinder 12 may be equal to or larger than the amount of increase in the volume of the second space S2 of the first cylinder 11 or the second space S4 of the second cylinder 12 when the molten resin flows.

As shown in <Expression 2>, an amount that the volume of the second space S2 of the first cylinder 11 or the second space S4 of the second cylinder 12 may increase as a result of movement of the pressurizing pistons 14d and 15d toward the Z-axis positive side from the place in which they are arranged in the farthest place of the Z-axis negative side may be equal to or larger than a difference obtained by subtracting the amount of increase in the volume of the second space S2 of the first cylinder 11 or the volume of the second space S4 of the second cylinder 12 from the volume of the molten resin.

Accordingly, it is possible to absorb the molten resin obtained by subtracting the amount of increase in the volume of the second space S2 of the first cylinder 11 or the volume of the second space S4 of the second cylinder 12 from the volume of the molten resin, which is calculated from <Expression 1>, by the pressurizing pistons 14d and 15d moving toward the Z-axis positive side.

<Expression 3> is a solution of <Expression 1> and <Expression 2> for the filling rate of the resin material M. Even when a different type of resin material M or the like is used, it is possible to prevent gas from flowing into the second space S2 of the first cylinder 11 or the second space S4 of the second cylinder 12 by satisfying <Expression 3>.

Next, a flow in which the workpiece is molded using the injection molding apparatus 1 according to this embodiment will be described. FIGS. 9 to 13 are diagrams showing operations of the injection molding apparatus according to this embodiment. In FIGS. 9 to 13, the upper stage shows an operation of the injection molding machine 2 and the lower stage shows timings when the resin material M is plasticized in the first cylinder 11 and the second cylinder 12 and when the molten resin R is injected.

In the state shown in FIG. 9(a), in a state in which the supply of the resin material M to the first space S1 of the first cylinder 11 from the first hopper 32a of the supply apparatus 3 is completed, the first piston unit 14 moves toward the Z-axis negative side and injects the molten resin R that is made to flow into the second space S2 of the first cylinder 11.

On the other hand, the second piston unit 15 moves to the Z-axis negative side, and injection of the molten resin R from the second space S4 of the second cylinder 12 is started. It is assumed here that the pressurizing piston 15d of the second piston unit 15 is arranged in the farthest place of the Z-axis positive side. It is further assumed that the exhaust valve 31c of the exhaust part 31 is closed.

From the above state, the first controller 19 causes the movement of the second piston unit 15 toward the Z-axis negative side to be continued and causes injection of the molten resin R to be continued by controlling the motor 17a while causing the movement of the first piston unit 14 toward the Z-axis negative side to be continued and causing injection of the molten resin R to be continued by controlling the motor 16a.

Next, after the first controller 19 confirms that the first piston unit 14 has reached the farthest place of the Z-axis negative side by referring to the results of the detection in the encoder 16f, as shown in FIG. 9(b)→FIG. 9(c)→FIG. 10(a), the first controller 19 controls the motor 16a and causes the movement of the first piston unit 14 toward the Z-axis positive side to be started.

As described above, during the period from start of the injection of the molten resin R from the second cylinder 12 to stop of the injection of the molten resin R from the first cylinder 11, the molten resin R is injected from the first cylinder 11 and the second cylinder 12.

Therefore, it is possible to make the period during which the molten resin R is injected from the second cylinder 12 overlap the period during which the molten resin R is injected from the first cylinder 11 for a first preset period. It is therefore possible to continuously inject the molten resin R from the first cylinder 11 and the second cylinder 12.

The first preset period can be set as appropriate in accordance with the movement speeds of the respective piston units 14 and 15. Then, the first controller 19 adjusts the movement speeds of the respective piston units 14 and 15 by controlling the motors 16a and 17a in such a way that the injection amount of the molten resin R injected from the injection part 18 becomes equal to a target injection amount, whereby it is possible to mold a desired workpiece with a high accuracy.

When the movement of the first piston unit 14 toward the Z-axis positive side is started, the resin material M is compressed by the first piston unit 14, the blocking part 11a of the first cylinder 11, and the side wall part 11b of the first cylinder 11, is then plasticized while passing through the groove parts 14f of the torpedo piston 14a of the first piston unit 14 to become a molten resin R, which then flows into the second space S2 of the first cylinder 11.

In this case, since the supply hole 11d is formed in the side wall part 11b of the first cylinder 11, the resin material M is not likely to be leaked out from the supply hole 11d. Moreover, the force on the Z-axis positive side that is applied when the resin material M is plasticized by the first piston unit 14 can be received by the blocking part 11a of the first cylinder 11.

Further, when the surface of the torpedo piston 14a of the first piston unit 14 on the Z-axis positive side is formed in an inclined surface that is inclined toward the Z-axis negative side from the center of the torpedo piston 14a toward the peripheral part thereof, the resin material M can be properly guided to the groove parts 14f of the torpedo piston 14a of the first piston unit 14 when the first piston unit 14 moves toward the Z-axis positive side.

Then, when the first piston unit 14 moves toward the Z-axis positive side, the non-return ring 14b of the first piston unit 14 is pushed toward the Z-axis negative side, and the molten resin R can be properly flown into the second space S2 of the first cylinder 11 from the through-hole of the non-return ring 14b via the gap between the torpedo piston 14a and the non-return ring 14b.

When the first piston unit 14 moves toward the Z-axis positive side as described above, the pressurizing piston 14d protrudes toward the Z-axis negative side with respect to the torpedo piston 14a by the energizing force of the energizing means 14e in such a way that the state in which the end part of the pressurizing piston 14d on the Z-axis negative side is in contact with the end plate 13 is maintained.

In this embodiment, the volume of the second space S2 in a state in which the area of the region surrounded by the outer periphery in the XY cross section of the pressurizing piston 14d is equal to or larger than the area of the region surrounded by the outer periphery in the XY cross section of the rod 16d, the torpedo piston 14a is arranged on the farthest place of the Z-axis positive side in order to inject the molten resin R, and the pressurizing piston 14d is arranged in the second space S2 of the first cylinder 11 is equal to or smaller than the volume of the first space S1 in a state in which the torpedo piston 14a is arranged in the farthest place of the Z-axis negative side in order to plasticize the resin material M and the rod 16d is arranged in the first space S1 of the first cylinder 11.

Therefore, the pressurizing piston 14d is energized by the energizing means 14e in such a way that the amount of increase in the volume of the second space S2 of the first cylinder 11 when the torpedo piston 14a moves toward the Z-axis positive side becomes equal to or smaller than the amount of decrease in the volume of the first space S1 of the first cylinder 11, whereby it is possible to prevent gas from flowing in when the molten resin R flows into the second space S2 of the first cylinder 11.

On the other hand, the first controller 19 controls the motor 17a while referring to the results of the detection in the encoder 17f, and causes the movement of the second piston unit 15 toward the Z-axis negative side to be continued. Accordingly, the molten resin R is injected via the through-hole 13c on the Y-axis positive side and the second branch path 18c and the outlet 18a of the injection part 18 while pushing the non-return valve 13b of the end plate 13 on the Y-axis positive side toward the Z-axis negative side. At this time, the non-return valve 13b on the Y-axis negative side interrupts the flow of the molten resin R toward the Z-axis positive side by the pressure of the molten resin R injected from the second cylinder 12.

Then, when the second piston unit 15 moves to the Z-axis negative side, the non-return ring 15b of the second piston unit 15 is pushed toward the Z-axis positive side and the groove parts 15f of the torpedo piston 15a are blocked by the non-return ring 15b, whereby it is possible to prevent the molten resin R from flowing back into the first space S3 of the second cylinder 12 via the groove parts 15f of the torpedo piston 15a.

Next, after the first controller 19 confirms that the first piston unit 14 has reached the farthest place of the Z-axis positive side by referring to the encoder 16f, as shown in FIG. 10(b), the first controller 19 controls the motor 16a to cause the movement of the first piston unit 14 toward the Z-axis negative side to be started. On the other hand, the first controller 19 controls the motor 17a while referring to the encoder 17f to cause the movement of the second piston unit 15 toward the Z-axis negative side to be continued.

Note that the pressurizing piston 14d of the first piston unit 14 protrudes most in the Z-axis negative side from the torpedo piston 14a, and the pressure of the molten resin R inside the second space S2 of the first cylinder 11 increases as the first piston unit 14 moves toward the Z-axis negative side.

Then, the molten resin R in the second space S2 of the first cylinder 11 enters the enter part 14j of the pressurizing piston 14d, which causes the force by the pressure of the molten resin R to exceed the energizing force of the energizing means 14e. Then, as shown in FIG. 10(c)→FIG. 11(a)→FIG. 11(b), the pressurizing piston 14d is pushed toward the Z-axis negative side. At this time, the gas inside the space surrounded by the torpedo piston 14a and the pressurizing piston 14d is exhausted into the case 16e from the exhaust path 31a by the amount of the decrease in the volume of the space.

On the other hand, after the first controller 19 confirms that the second piston unit 15 has reached a preset position in the Z-axis direction by referring to the encoder 17f, the second controller 34 controls and opens the exhaust valve 31c of the exhaust part 31.

Accordingly, the gas in the first space S3 of the second cylinder 12 enters the case 16e through the exhaust path 31a of the rod 17d, and is then discharged via the exhaust hole 31b and the exhaust valve 31c. This causes the gas that flows into the first space S3 of the second cylinder 12 from the second hopper 32b to flow. Further, as shown in FIG.

10(c)→FIG. 11(a)→FIG. 11(b), the resin material M is pushed from the second hopper 32b by the gas, and is supplied to the first space S3 of the second cylinder 12 via the supply hole 12d of the second cylinder 12.

At this time, since the supply hole 12d is formed in the side wall part 12b of the second cylinder 12, the resin material M falls toward the Z-axis negative side while swirling along with the gas. Therefore, the resin material M can be supplied into the first space S3 of the second cylinder 12 substantially evenly.

Next, when the pressurizing piston 14d reaches the farthest place of the Z-axis positive side (e.g., the end part of the pressurizing piston 14d on the Z-axis positive side is in contact with the end part of the torpedo piston 14a on the Z-axis positive side) and the pressure that pushes the molten resin R toward the Z-axis negative side in the end part of the first piston unit 14 on the Z-axis negative side reaches a preset pressure, the non-return valve 13b of the end plate 13 on the Y-axis negative side is opened.

Accordingly, the molten resin R is injected via the through-hole 13c on the Y-axis negative side and the first branch path 18b and the outlet 18a of the injection part 18 while pushing the non-return valve 13b of the end plate 13 on the Y-axis negative side toward the Z-axis negative side.

At this time, when the first piston unit 14 moves toward the Z-axis negative side, the non-return ring 14b of the first piston unit 14 is pushed toward the Z-axis positive side and the groove parts 14f of the torpedo piston 14a are closed by the non-return ring 14b, whereby it is possible to prevent the molten resin R from flowing back into the first space S1 of the first cylinder 11 via the groove parts 14f of the torpedo piston 14a.

On the other hand, after the first controller 19 confirms that the second piston unit 15 has reached a place near the farthest place of the Z-axis negative side by referring to the encoder 17f, the second controller 34 controls and closes the exhaust valve 31c of the exhaust part 31. At this time, the first space S3 of the second cylinder 12 is filled with the resin material M.

That is, by just opening the exhaust valve 31c of the exhaust part 31, the resin material M can be automatically supplied to the first space S3 of the second cylinder 12. At this time, the resin material M is supplied to the first space S3 of the second cylinder 12 between the time when the second piston unit 15 reaches a predetermined position in the Z-axis direction and the time when it reaches a place near the farthest place of the Z-axis negative side, whereby the resin material M can be quantitatively supplied to the second cylinder 12.

Then, it is possible to make the period during which the resin material M is supplied to the first space S3 of the second cylinder 12 overlap the period during which the molten resin R is injected from the second cylinder 12 for a second preset period.

It is therefore possible to efficiently repeat the injection of the molten resin R from the second cylinder 12 and the supply of the resin material M to the second cylinder 12. The second preset period may be set as appropriate in accordance with the movement speed of the second piston unit 15, a timing when the exhaust valve 31c of the exhaust part 31 is opened, etc.

Next, after the first controller 19 confirms that the second piston unit 15 has reached the farthest place of the Z-axis negative side by referring to the encoder 17f, the first controller 19 controls the motor 17a, and as shown in FIG. 11(c)→FIG. 12(a)→FIG. 12(b), causes the movement of the second piston unit 15 toward the Z-axis positive side to be continued. At this time, the non-return valve 13b on the Y-axis positive side interrupts the flow of the molten resin R toward the Z-axis positive side by the pressure of the molten resin R injected from the first cylinder 11.

Accordingly, the resin material M is compressed by the second piston unit 15, the blocking part 12a of the second cylinder 12, and the side wall part 12b of the second cylinder 12, is plasticized while passing through the groove parts 15f of the torpedo piston 15a of the second piston unit 15 to be a molten resin R, and flows into the second space S4 of the second cylinder 12.

At this time, since the supply hole 12d is formed in the side wall part 12b of the second cylinder 12, the resin material M is not likely to be leaked out from the supply hole 12d. Moreover, the force on the Z-axis positive side that is acted when the resin material M is plasticized in the second piston unit 15 can be received by the blocking part 12a of the second cylinder 12.

Further, when the surface of the torpedo piston 15a of the second piston unit 15 on the Z-axis positive side is formed on the inclined surface that is inclined toward the Z-axis negative side from the center of the torpedo piston 15a toward the peripheral part thereof, the resin material M can be properly guided to the groove parts 15f of the torpedo piston 15a of the second piston unit 15 when the second piston unit 15 moves toward the Z-axis positive side.

When the second piston unit 15 moves toward the Z-axis positive side, the non-return ring 15b of the second piston unit 15 is pushed toward the Z-axis negative side, which allows the molten resin R to properly flow into the second space S4 of the second cylinder 12 from the through-hole of the non-return ring 15b via the gap between the torpedo piston 15a and the non-return ring 15b.

When the second piston unit 15 moves toward the Z-axis positive side as described above, the pressurizing piston 15d protrudes toward the Z-axis negative side with respect to the torpedo piston 15a by the energizing force of the energizing means 15e so as to maintain the state in which the end part of the pressurizing piston 15d on the Z-axis negative side is in contact with the end plate 13.

In this embodiment, the volume of the second space S4 in a state in which the area of the region surrounded by the outer periphery in the XY cross section of the pressurizing piston 15d is equal to or larger than the area of the region surrounded by the outer periphery in the XY cross section of the rod 17d, the torpedo piston 15a is arranged on the farthest place of the Z-axis positive side in order to inject the molten resin R, and the pressurizing piston 15d is arranged in the second space S4 of the second cylinder 12 is equal to or smaller than the volume of the first space S3 in a state in which the torpedo piston 15a is arranged in the farthest place of the Z-axis negative side in order to plasticize the resin material M and the rod 17d is arranged in the first space S3 of the second cylinder 12.

Therefore, the pressurizing piston 15d is energized by the energizing means 15e in such a way that the amount of increase in the volume of the second space S4 of the second cylinder 12 becomes equal to or smaller than the amount of decrease in the volume of the first space S3 of the second cylinder 12 when the torpedo piston 15a moves toward the Z-axis positive side, whereby it is possible to prevent gas from flowing in when the molten resin R flows into the second space S4 of the second cylinder 12.

On the other hand, the first controller 19 controls the motor 16a while referring to the results of the detection in the encoder 16f to cause the movement of the first piston unit 14 toward the Z-axis negative side to be continued. Accordingly, during the period from the start of the injection of the molten resin R from the first cylinder 11 to the stop of the injection of the molten resin R from the second cylinder 12, the molten resin R is injected from the first cylinder 11 and the second cylinder 12.

Therefore, the period during which the molten resin R is injected from the first cylinder 11 can be made to overlap the period during which the molten resin R is injected from the second cylinder 12 for a first preset period. Accordingly, the molten resin R can be continuously injected from the first cylinder 11 and the second cylinder 12.

Then, the first controller 19 adjusts the movement speeds of the respective piston units 14 and 15 by controlling the motors 16a and 17a in such a way that the injection amount of the molten resin R injected from the injection part 18 becomes equal to a target injection amount, whereby it is possible to mold a desired workpiece with a high accuracy.

Next, as shown in FIG. 12(c), after the first controller 19 confirms that the second piston unit 15 has reached the farthest place of the Z-axis positive side by referring to the encoder 17f, the first controller 19 controls the motor 17a to cause the movement of the second piston unit 15 toward the Z-axis negative side to be started. On the other hand, the first controller 19 controls the motor 16a while referring to the encoder 16f to cause the movement of the first piston unit 14 toward the Z-axis negative side to be continued.

Note that the pressurizing piston 15d of the second piston unit 15 protrudes most toward the Z-axis negative side from the torpedo piston 15a. Along with the movement of the second piston unit 15 toward the Z-axis negative side, the pressure of the molten resin R in the second space S4 of the second cylinder 12 increases.

Then, the molten resin R in the second space S4 of the second cylinder 12 enters the enter part 15j of the pressurizing piston 15d, which causes the force by the pressure of the molten resin R to exceed the energizing force of the energizing means 15e, and then the pressurizing piston 15d is pushed toward the Z-axis negative side, as shown in FIG. 13(a). At this time, the gas in the space surrounded by the torpedo piston 15a and the pressurizing piston 15d is exhausted into the case 16e from the exhaust path 31a by the amount of the decrease in the volume of the space.

On the other hand, after the first controller 19 confirms that the first piston unit 14 has reached a preset position in the Z-axis direction by referring to the encoder 16f, the second controller 34 controls and opens the exhaust valve 31c of the exhaust part 31.

Accordingly, the gas in the first space S1 of the first cylinder 11 enters the case 16e after passing through the exhaust path 31a of the rod 16d, and is discharged via the exhaust hole 31b and the exhaust valve 31c. As a result, a flow of the gas that flows into the first space S1 of the first cylinder 11 from the first hopper 32a occurs, the resin material M is pushed by the gas from the first hopper 32a, and is supplied to the first space S1 of the first cylinder 11 via the supply hole 11d of the first cylinder 11.

Since the supply hole 11d is formed in the side wall part 11b of the first cylinder 11, the resin material M falls toward the Z-axis negative side while swirling along with the gas. Therefore, it is possible to supply the resin material M into the first space S1 of the first cylinder 11 substantially evenly.

Next, as shown in FIG. 13(b), after the first controller 19 confirms that the first piston unit 14 has reached a place near the farthest place of the Z-axis negative side by referring to the encoder 16f, the second controller 34 controls and closes the exhaust valve 31c of the exhaust part 31. In this case, the first space S1 of the first cylinder 11 is filled with the resin material M.

That is, by just opening the exhaust valve 31c of the exhaust part 31, the resin material M can be automatically supplied to the first space S1 of the first cylinder 11. At this time, the resin material M is supplied to the first space S1 of the first cylinder 11 between the time when the first piston unit 14 reaches a predetermined position in the Z-axis direction and the time when it reaches a place near the farthest place on the Z-axis negative side, whereby it is possible to quantitatively supply the resin material M to the first cylinder 11.

Then, it is possible to make the period during which the resin material M is supplied to the first space S1 of the first cylinder 11 overlap the period during which the molten resin R is injected from the first cylinder 11 for a second preset period.

Therefore, it is possible to efficiently repeat the injection of the molten resin R from the first cylinder 11 and the supply of the resin material M to the first cylinder 11. The second preset period may be set as appropriate in accordance with the movement speed of the first piston unit 14, a timing when the exhaust valve 31c of the exhaust part 31 is opened, etc.

Next, the first controller 19 causes the movement of the first piston unit 14 toward the Z-axis negative side to be continued by controlling the motor 16a and causes the movement of the second piston unit 15 toward the Z-axis negative side to be continued by controlling the motor 17a.

Then, as shown in FIG. 13(c), when the state transits to the one shown in FIG. 9(a) and the pressurizing piston 15d reaches the farthest place of the Z-axis positive side (e.g., the end part of the pressurizing piston 15d on the Z-axis positive side comes into contact with the end part of the torpedo piston 15a on the Z-axis positive side) and the pressure for pushing the molten resin R toward the Z-axis negative side in the end part of the second piston unit 15 on the Z-axis negative side reaches the preset pressure, the non-return valve 13b of the end plate 13 on the Y-axis positive side is opened.

Accordingly, the molten resin R is injected via the through-hole 13c on the Y-axis positive side, and the second branch path 18c and the outlet 18a of the injection part 18 while pushing the non-return valve 13b of the end plate 13 on the Y-axis positive side toward the Z-axis negative side.

As described above, the third controller 53 controls the gantry device 51 and the lifting device 52 in such a way that a desired workpiece is additively manufactured on a surface of the table 4 on the Z-axis positive side by the injected molten resin R while continuously injecting the molten resin R from the first cylinder 11 and the second cylinder 12 by controlling, by the first controller 19, the motors 16a and 17a, whereby the workpiece can be molded.

In this case, the fourth controller 64 controls the first heating part 61 and the second heating part 62 in such a way that the temperature of the injected molten resin R falls within a preset range based on the results of the detection in the temperature detection part 63. Accordingly, it is possible to inject the molten resin R in a stable state.

The injection molding apparatus 1, the injection molding machine 2, and the injection molding method according to this embodiment include the pressurizing pistons 14d and 15d that can be slid in the Z-axis direction and the energizing means 14e and 15e that energize the pressurizing pistons 14d and 15d in the Z-axis negative side with respect to the torpedo pistons 14a and 15a in such a manner that the amounts of protrusion toward the second space S2 of the first cylinder 11 and the second space S4 of the second cylinder 12 with respect to the torpedo pistons 14a and 15a are changed.

Therefore, it is possible to reduce the volume of the second spaces S2 and S4 when the molten resin R flows into the second space S2 of the first cylinder 11 and the second space S4 of the second cylinder 12 and to prevent gas from flowing into the second spaces S2 and S4 when the molten resin R is made to flow into the second spaces S2 and S4. Therefore, the injection molding apparatus 1, the injection molding machine 2, and the injection molding method according to this embodiment are able to prevent gas from being mixed into the molten resin R when the molten resin R is injected, thereby contributing to improving the quality of the workpiece.

In particular, in the injection molding apparatus 1, the injection molding machine 2, and the injection molding method according to this embodiment, the energizing means 14e and 15e energize the pressurizing pistons 14d and 15d in such a way that the amount of increase in the volume of the second space S2 of the first cylinder 11 and the second space S4 of the second cylinder 12 when the torpedo pistons 14a and 15a move toward the Z-axis positive side becomes equal to or smaller than the amount of decrease in the volume of the first space S1 of the first cylinder 11 and the first space S3 of the second cylinder 12, whereby it is possible to prevent gas from flowing in when the molten resin R flows into the second space S2 of the first cylinder 11 and the second space S4 of the second cylinder 12.

In addition, the injection molding apparatus 1, the injection molding machine 2, and the injection molding method according to this embodiment cause the period during which the molten resin R is injected from the first cylinder 11 to partially overlap the period during which the molten resin R is injected from the second cylinder 12. Accordingly, it is possible to continuously inject the molten resin R from the first cylinder 11 and the second cylinder 12.

Further, the injection molding apparatus 1, the injection molding machine 2, and the injection molding method according to this embodiment are able to automatically supply the resin material M to the first cylinder 11 and the second cylinder 12 by just controlling the exhaust valve 31c of the exhaust part 31. That is, the supply apparatus 3 according to this embodiment can serve as an automatic supply apparatus of the resin material M. Therefore, the resin material M can be supplied with a simple structure.

Further, the resin material M is supplied to the first cylinder 11 or the second cylinder 12 between the time when the first piston unit 14 or the second piston unit 15 reaches a predetermined position in the Z-axis direction and the time when it reaches a place near the farthest place on the Z-axis negative side, whereby the resin material M can be quantitatively supplied to the first cylinder 11 and the second cylinder 12. Therefore, the measuring device of the resin material M may not be provided.

Note that the predetermined position in the Z-axis direction is preferably set in such a way that the first space S1 of the first cylinder 11 or the first space S3 of the second cylinder 12 is filled with the resin material M before the first piston unit 14 or the second piston unit 15 reaches a place near the farthest place of the Z-axis negative side.

Since the end part of the first cylinder 11 on the Z-axis negative side is opened, the first piston unit 14 and the rod 16d of the first drive part 16 can be inserted from the open port of the first cylinder 11 on the Z-axis negative side. Likewise, since the end part of the second cylinder 12 on the Z-axis negative side is opened, the second piston unit 15 and the rod 17d of the second drive part 17 can be inserted from the open port of the second cylinder 12 on the Z-axis negative side. Therefore, the plunger included in the injection molding apparatus disclosed in Japanese Unexamined Patent Application Publication No. 2017-132039 may not be provided.

Incidentally, as shown in FIG. 3, the injection molding machine 2 may preferably include a cooling part 8 between the case 16e of the first drive part 16, and the first cylinder 11 and the second cylinder 12. The cooling part 8 has, for example, a ring shape as its basic form, and includes a through-hole 8a through which the rod 16d or 17d is made to pass so as to penetrate through the cooling part 8 in the Z-axis direction. Then, a cooling path 8b through which a cooling medium flows is formed in the cooling part 8 so as to surround the through-hole 8a. According to the above structure, when the cooling medium is made to flow through the cooling path 8b of the cooling part 8 when a workpiece is molded in the injection molding apparatus 1, heat from the first cylinder 11 and the second cylinder 12 is not likely to be transferred to the bearing 16g of the first drive part 16 and the bearing 17g of the second drive part 17. Therefore, it is possible to prevent the temperatures of the bearings 16g and 17g from being changed and to thus prevent the bearings 16g and 17g from malfunctioning. As a result, the workpiece can be molded with a high accuracy.

Second Embodiment

Figure 14:
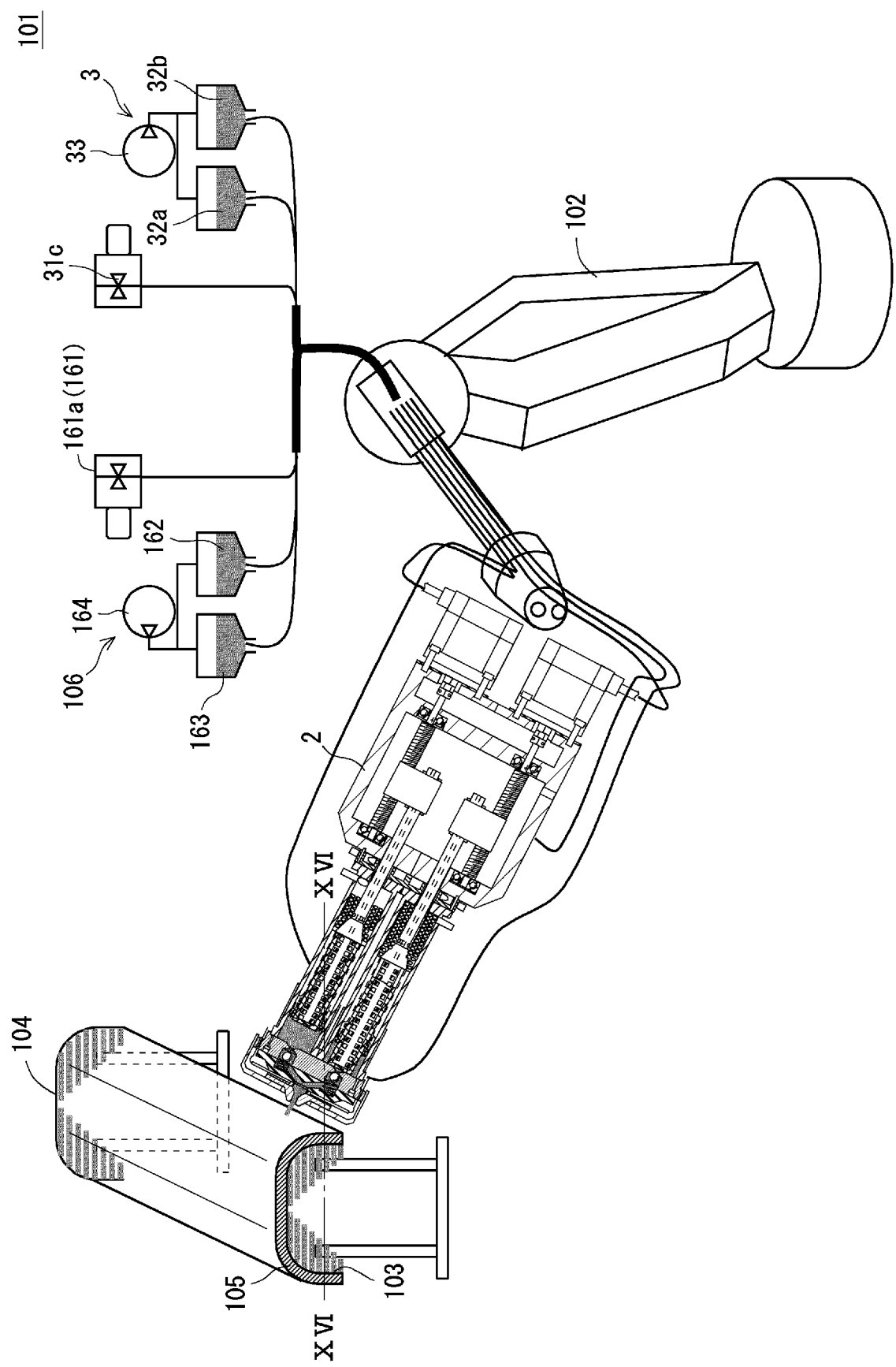
FIG. 14 is a diagram schematically showing an injection molding apparatus according to a second embodiment.
Figure 15:
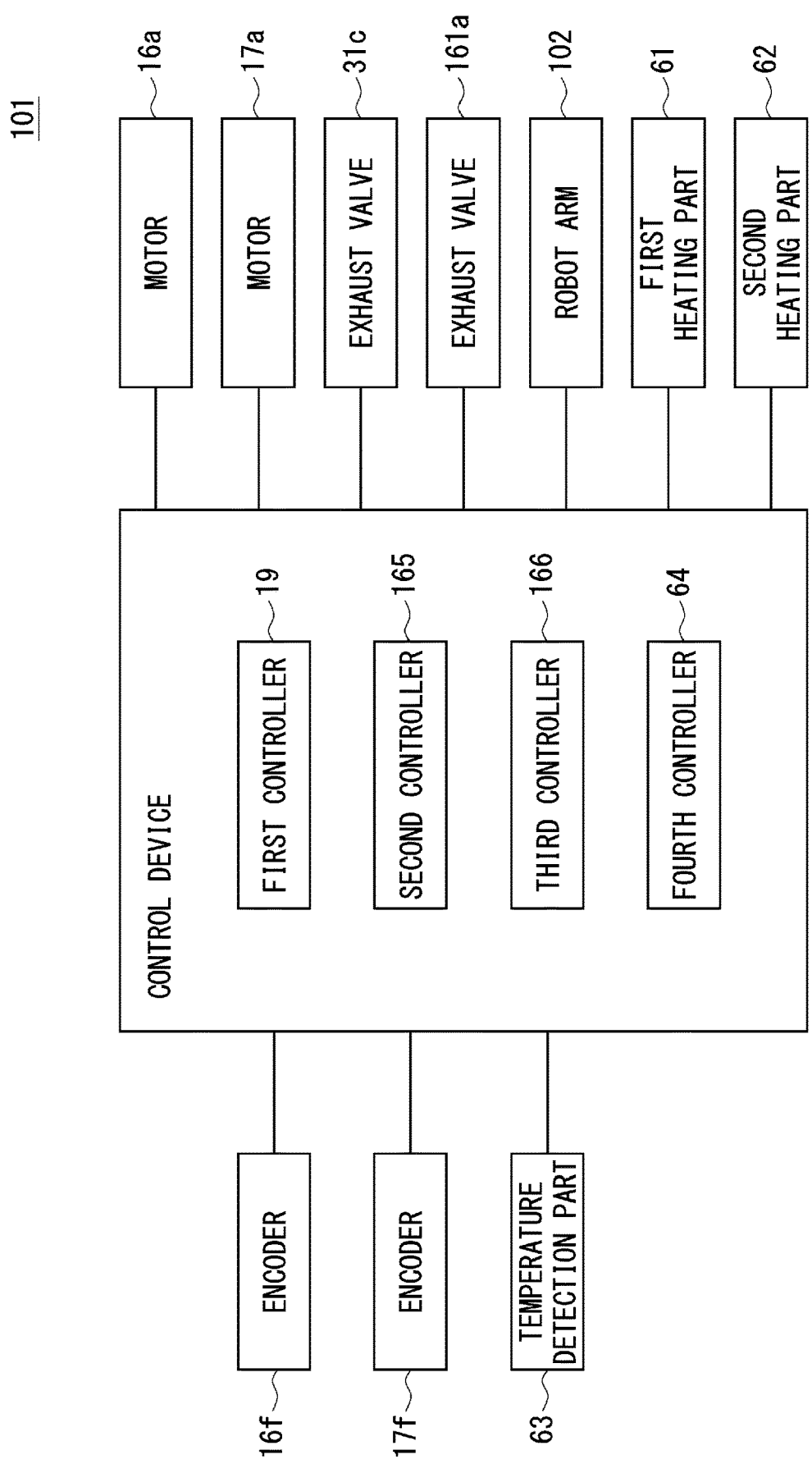
FIG. 15 is a block diagram showing a control system of the injection molding apparatus according to the second embodiment.

FIG. 14 is a diagram schematically showing an injection molding apparatus according to this embodiment. FIG. 15 is a block diagram showing a control system of the injection molding apparatus according to this embodiment. As shown in FIGS. 14 and 15, an injection molding apparatus 101 according to this embodiment has a structure substantially the same as that of the injection molding apparatus 1 according to the first embodiment. The injection molding apparatus 101 according to this embodiment has a structure in which an injection molding machine 2 is fixed to a robot arm 102. In the following description, components that are the same as those in the first embodiment are denoted by the same reference symbols, and the redundant descriptions thereof will be omitted.

Figure 16:
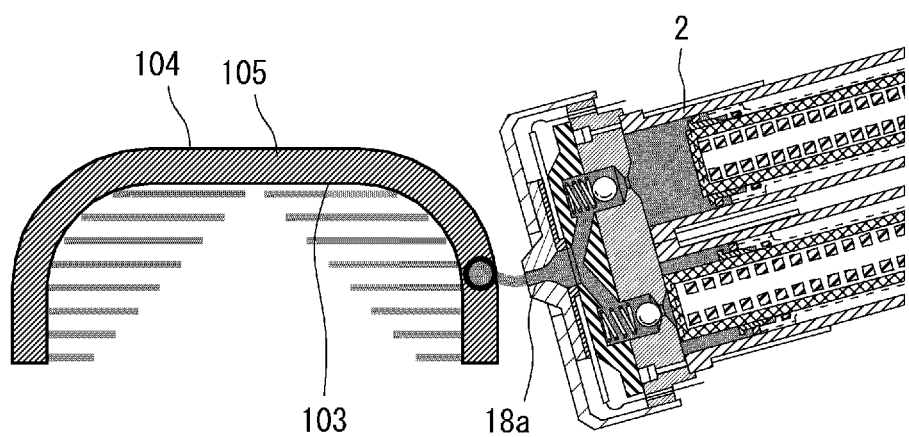
FIG. 16 is a cross-sectional view taken along the line XVI of FIG. 14.

The injection molding apparatus 101 according to this embodiment is configured to be able to properly mold a workpiece 104 using a general-purpose base 103. FIG. 16 is a cross-sectional view taken along the line XVI of FIG. 14. That is, when the workpiece 104 is molded using the general-purpose base 103, as shown in FIG. 16, it is required to mold a support 105 for filling the gap between the general-purpose base 103 and the workpiece 104. Therefore, the injection molding apparatus 101 includes, besides the supply apparatus (first supply apparatus) 3 that is used to mold the workpiece 104, a second supply apparatus 106 used when the support 105 is molded.

The second supply apparatus 106 has a structure the same as that of the supply apparatus 3 according to the first embodiment. As shown in FIGS. 14 and 15, the second supply apparatus 106 includes an exhaust part 161, a first hopper 162 that supplies a resin material to the first cylinder 11, a second hopper 163 that supplies a resin material to the second cylinder 12, a pressurizing part 164 that pressurizes the inside of the first hopper 162 and the second hopper 163, and a second controller 165 that controls an exhaust valve 161a of the exhaust part 161 or controls switching between the first supply apparatus 3 and the second supply apparatus 106. Note that the exhaust path 31a and the exhaust hole 31b of the exhaust part 31 and the second controller 165 may be shared with the first supply apparatus 3.

The robot arm 102 is, for example, a five-axis handling robot. While the details of the robot arm 102 will be described later, it is controlled by a third controller 166.

Next, a flow of molding the workpiece 104 using the injection molding apparatus 101 according to this embodiment will be described. First, the first controller 19 controls the motors 16a and 17a to repeat the plasticization of the resin material for molding the support supplied to the first cylinder 11 and the second cylinder 12 and the injection of the molten resin. At the same time, the third controller 166 controls the robot arm 102 to inject the molten resin along the surface of the general-purpose base 103 to mold the support 105. At this time, the resin material for molding the support can be supplied to the first cylinder 11 and the second cylinder 12 by controlling, by the second controller 165, the second supply apparatus 106.

Next, the first controller 19 controls the motors 16a and 17a to repeat the plasticization of the resin material for workpiece molding supplied to the first cylinder 11 and the second cylinder 12 and the injection of the molten resin. At the same time, the third controller 166 controls the robot arm 102 to inject the molten resin along the surface of the support 105 and mold the workpiece 104. At this time, the resin material for workpiece molding can be supplied to the first cylinder 11 and the second cylinder 12 by controlling, by the second controller 165, the first supply apparatus 3.

When the support 105 and the workpiece 104 are molded in the above manner, the outlet 18a of the injection molding machine 2 may be arranged on the opposite side with respect to the gravity direction. Even in this case, however, since the injection molding machine 2 includes the pressurizing pistons 14d and 15d, as described above, it is possible to prevent gas from flowing into the second spaces S2 and S4 when the plasticized molten resin flows into the second space S2 of the first cylinder 11 and the second space S4 of the second cylinder 12.

Moreover, the first supply apparatus 3 and the second supply apparatus 106 supply the resin material to the first cylinder 11 and the second cylinder 12 by the flow of the gas. Therefore, even in a state in which the outlet 18a of the injection molding machine 2 is arranged on the opposite side with respect to the gravity direction, the resin material may be properly supplied to the first cylinder 11 and the second cylinder 12.

Since the support 105 can be easily molded by the injection molding machine 2, it is possible to mold workpieces 104 having various shapes in a simple manner using the general-purpose base 103 in a simple manner.

Third Embodiment

Figure 17:
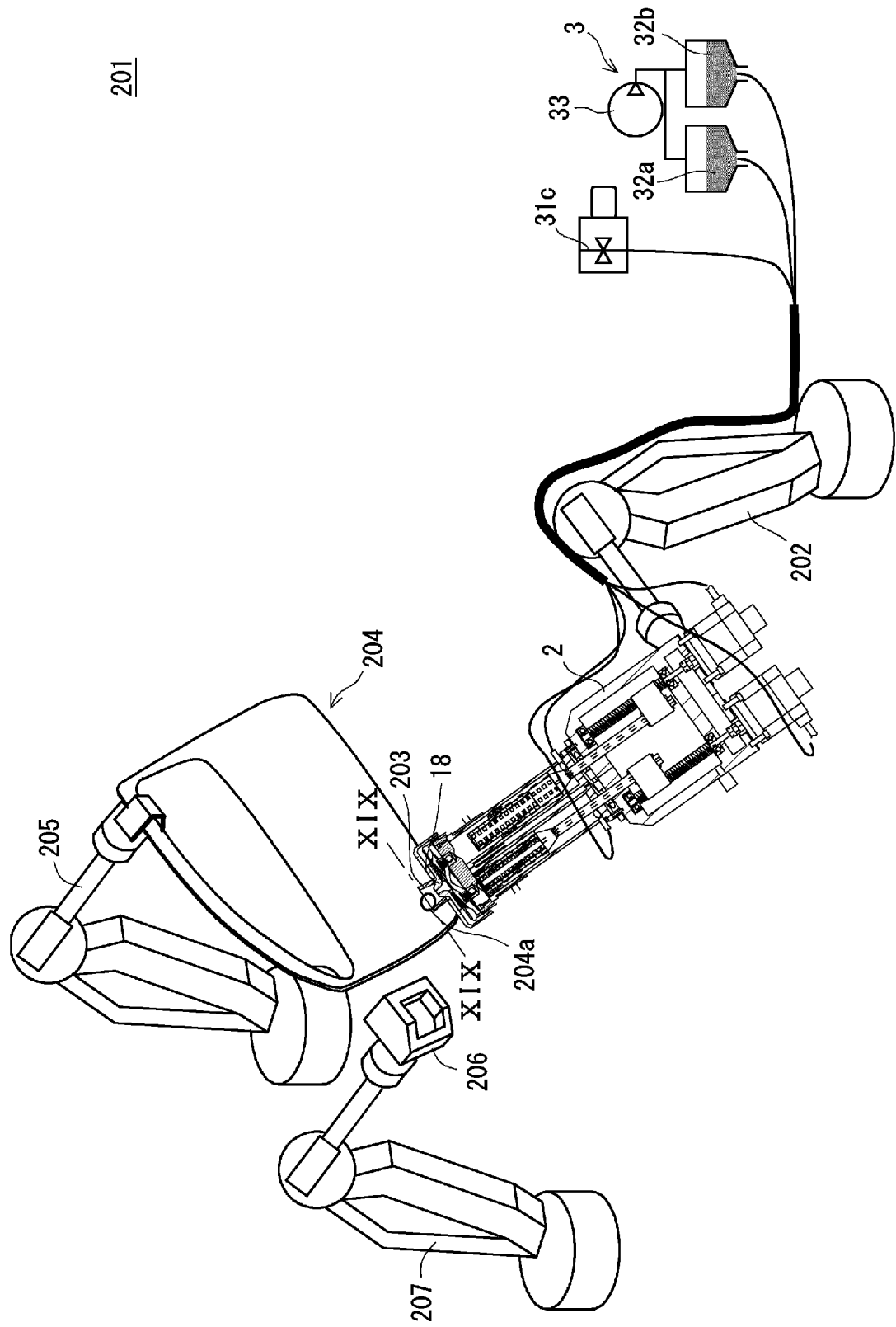
FIG. 17 is a diagram schematically showing an injection molding apparatus according to a third embodiment.
Figure 18:
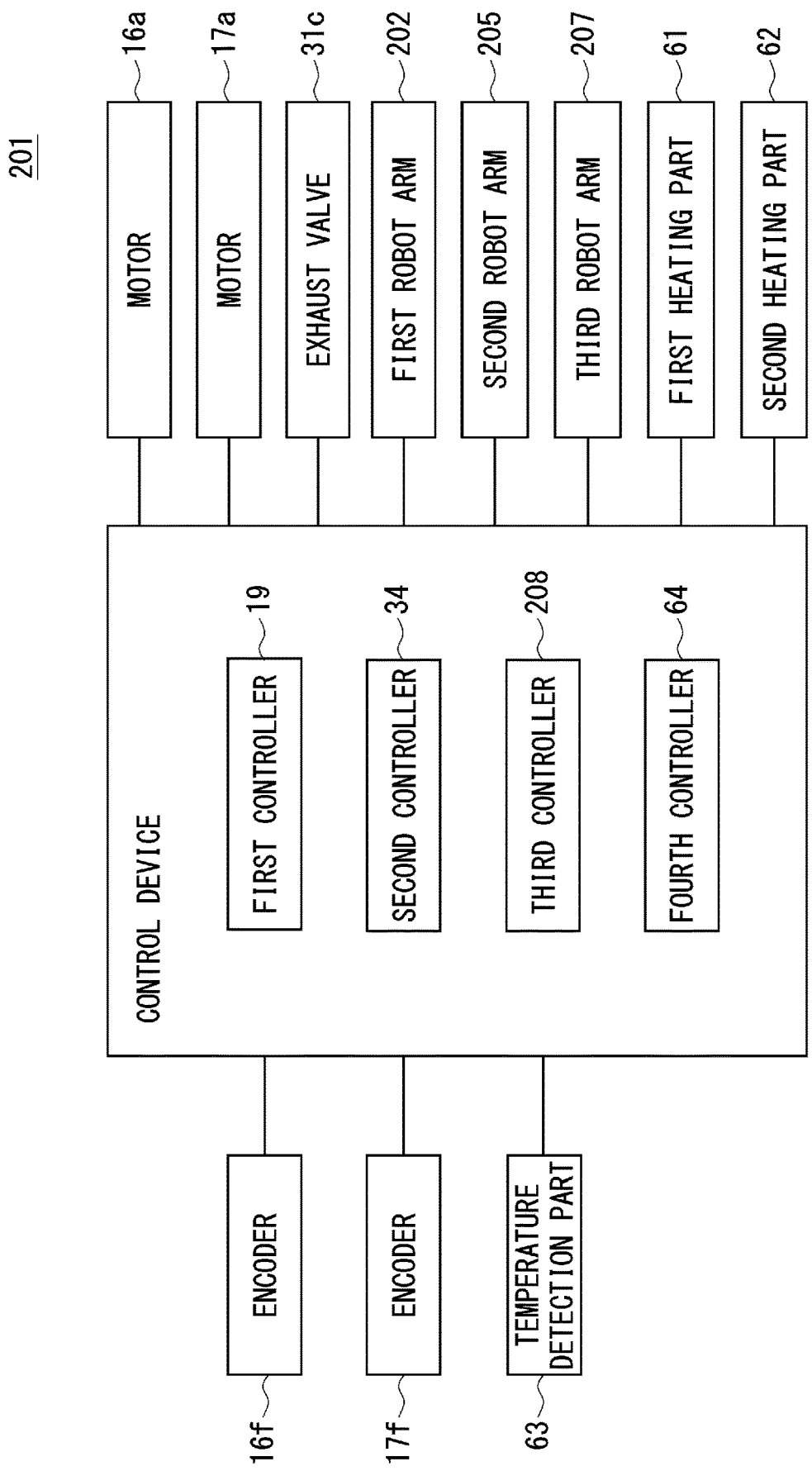
FIG. 18 is a block diagram showing a control system of the injection molding apparatus according to the third embodiment.

FIG. 17 is a diagram schematically showing an injection molding apparatus according to this embodiment. FIG. 18 is a block diagram showing a control system of the injection molding apparatus according to this embodiment. An injection molding apparatus 201 according to this embodiment is suitable, for example, when a resin part is bonded to a workpiece such as a door for automobiles. In the following description, components that are the same as those in the first embodiment are denoted by the same reference symbols, and the redundant descriptions thereof will be omitted.

As shown in FIG. 17, the injection molding apparatus 201 has a structure in which an injection molding machine 2 is fixed to a first robot arm 202 and a front die 203 is fixed to an injection part 18 of the injection molding machine 2. The injection molding apparatus 201 according to this embodiment includes a second robot arm 205 that grips a workpiece 204 and a third robot arm 207 to which a back die 206 is fixed.

The front die 203 and the back die 206 are molding dies for molding a resin part. The molten resin is injected into a space formed by the front die 203 and the back die 206, whereby the resin part is molded. The first robot arm 202, the second robot arm 205, and the third robot arm 207, which are multi-axis handling robots, are controlled by a third controller 208, although the details thereof will be described later.

Figure 19:
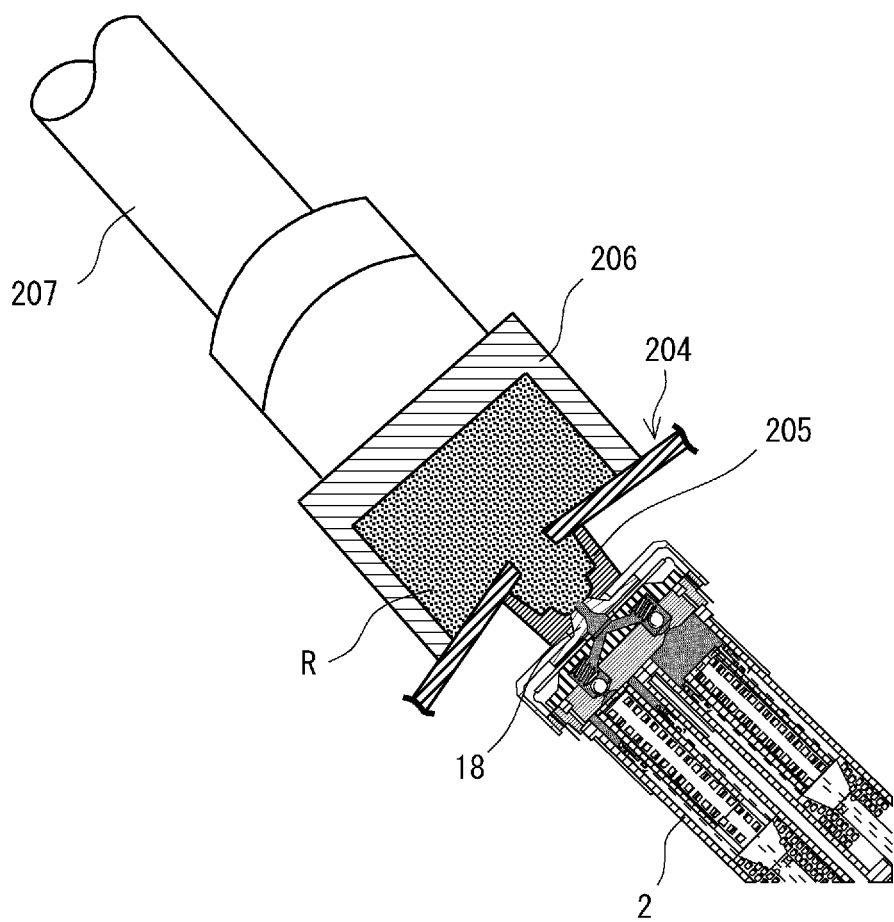
FIG. 19 is a cross-sectional view taken along the line XIX-XIX of FIG. 17.
Figure 20:
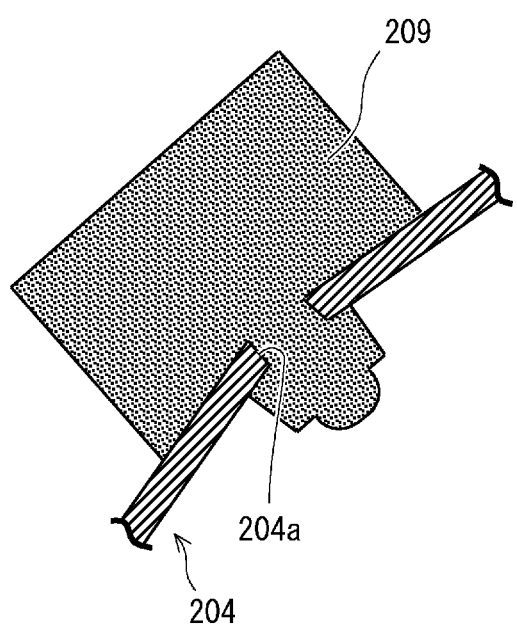
FIG. 20 is a cross-sectional view showing a state in which a resin part is bonded to a workpiece.

Next, a flow of bonding the resin part of the workpiece 204 using the injection molding apparatus 201 according to this embodiment will be described. FIG. 19 is a cross-sectional view taken along the line XIX-XIX of FIG. 17. FIG. 20 is a cross-sectional view showing a state in which the resin part is bonded to the workpiece. As shown in FIG. 20, in this embodiment, it is assumed that a resin part 209 is bonded to a penetration part 204a formed in the workpiece 204.

First, the third controller 208 controls the second robot arm 205, grips the workpiece 204, and fixes the workpiece 204 in a desired posture. Then, as shown in FIG. 19, the third controller 208 controls the first robot arm 202 so as to arrange the front die 203 in front of the workpiece 204 in such a way that the penetration part 204a of the workpiece 204 gripped by the second robot arm 205 is covered with the front die 203. At the same time, the third controller 208 controls the third robot arm 207 so as to arrange the back die 206 in such a way that it is opposed to the front die 203 with the workpiece 204 held therebetween.

Next, the first controller 19 controls the motors 16a and 17a to repeat the plasticization of the resin material supplied to the first cylinder 11 and the second cylinder 12 and the injection of the molten resin, whereby the molten resin is injected into a space formed of the front die 203 and the back die 206, and the resin part 209 is molded and bonded to the workpiece 204.

Since the outlet 18a of the injection part 18 of the injection molding machine 2 is narrowed, a fragile part of the resin part 209 is obtained. By causing the front die 203 to be separated from the workpiece 204, the resin part 209 can be cut at this fragile part. Accordingly, as shown in FIG. 20, the resin part 209 whose cross-sectional area on both sides of the workpiece 204 is larger than the cross-sectional area of the penetration part 204a of the workpiece 204 can be molded and bonded to the workpiece 204 in a simple manner.

When the resin part 209 is molded in the above manner, the outlet 18a of the injection molding machine 2 may be arranged on the opposite side with respect to the gravity direction. Even in this case, however, since the injection molding machine 2 includes the pressurizing pistons 14d and 15d, as described above, it is possible to prevent gas from flowing into the second spaces S2 and S4 when the plasticized molten resin flows into the second space S2 of the first cylinder 11 and the second space S4 of the second cylinder 12.

The present disclosure is not limited to the aforementioned embodiments and may be changed as appropriate without departing from the spirit of the present disclosure.

While the injection molding machine 2 according to the aforementioned embodiments includes the first cylinder 11 and the second cylinder 12, the number of cylinders may be either single or plural.

The structure of the supply apparatus according to the aforementioned embodiments is merely one example, and it is sufficient that a resin material be supplied to the first cylinder 11 and the second cylinder 12.

While the pressurizing pistons 14d and 15d are in contact with the end plate 13 when the molten resin R is injected in the aforementioned embodiments, the pressurizing pistons 14d and 15d may not be in contact with the end plate 13 and it is sufficient that the pressurizing pistons 14d and 15d protrude into the second space S2 of the first cylinder 11 and the second space S4 of the second cylinder 12 when the resin material M is plasticized.

While the energizing means is formed of an elastic member such as a coil spring in the aforementioned embodiments, this is merely one example. For example, the pressurized gas supplied from the pressurizing part 33 via the exhaust path 31a may be used as the energizing means. Further, they may be combined with each other.

While the present disclosure has been described as a hardware configuration in the aforementioned embodiments, the present disclosure is not limited thereto. The present disclosure may achieve desired processing by causing a Central Processing Unit (CPU) to execute a computer program.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (ROM), CD-R, CD-R/W, and semiconductor memories (such as mask ROM, Programmable ROM (PROM), Erasable PROM (EPROM), flash ROM, Random Access Memory (RAM), etc.). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An injection molding machine configured to cause a torpedo piston to slide inside a cylinder toward an opposite side of the cylinder to which an injection part is fixed to thereby plasticize a resin material supplied to a first space in the cylinder arranged on the side of the cylinder opposite to the side of the cylinder close to the injection part with the torpedo piston interposed therebetween among spaces of the first space and a second space in the cylinder arranged on the side of the cylinder close to the injection part, and to cause a molten resin to flow into the second space in the cylinder, and cause the torpedo piston to be slid toward the injection part inside the cylinder to thereby inject the molten resin from the injection part, the injection molding machine comprising:

a pressurizing piston that is inserted into a sliding part formed in the torpedo piston so that the pressurizing piston can be slid in an axial direction of the cylinder in such a way that an amount of protrusion of the piston into the second space with respect to the torpedo piston is changed, and energizing means for energizing the pressurizing piston toward the second space of the cylinder with respect to the torpedo piston, wherein the pressurizing piston has a bottomed cylindrical shape with an end on the injection part side closed, an outer diameter thereof being equal to the inner diameter of the torpedo piston, and is inserted into the torpedo piston, the energizing means is made of an elastic body and is disposed inside the pressurizing piston, and when the torpedo piston is moved inside the cylinder to the opposite side of the cylinder to which the injection part is fixed in order to plasticize the resin material, the energizing means energizes the pressurizing piston in such a way that an amount of increase in the volume of the second space of the cylinder becomes equal to or smaller than an amount of decrease in the volume of the first space of the cylinder; and as the pressure of the molten resin flowing into the second space of the cylinder rises, when a force pushing the pressurizing piston in the opposite side to the injection part side exceeds a force of the energizing means by which the pressurizing piston is energized, the pressurizing piston is pushed in the opposite side to the injection part side.

2. The injection molding machine according to claim 1, comprising:

a drive part that slides the torpedo piston inside the cylinder by moving a rod connected to the torpedo piston in an axial direction of the cylinder, wherein an outer cross section diameter of the pressurizing piston is equal to or larger than a cross section diameter of the rod, and the volume of the second space in a state in which the torpedo piston is arranged on a side of the cylinder opposite to a part of the cylinder closest to the injection part in order to inject the molten resin and the pressurizing piston is arranged in the second space of the cylinder is equal to or smaller than the volume of the first space in a state in which the torpedo piston is arranged in a part of the cylinder closest to the injection part in order to plasticize the resin material and the rod is arranged in the first space of the cylinder.

3. The injection molding machine according to claim 1, wherein a groove part as an enter part which the molten resin enters is formed in an end part of the pressurizing piston on a side of the pressurizing piston close to the injection part.

4. The injection molding machine according to claim 1, comprising:

a plurality of cylinders;

a plurality of torpedo pistons that are slid inside the respective cylinders;

a plurality of pressurizing pistons inserted into sliding parts of the respective torpedo pistons in such a way that the pressurizing pistons can be slid;

a plurality of energizing means for energizing each of the pressurizing pistons inside each of the plurality of cylinders against the torpedo piston towards the second space of the cylinder; and a plurality of drive parts configured to drive the respective torpedo pistons, wherein the plurality of drive parts are controlled in such a way that a period during which a molten resin is injected from at least a first cylinder of the plurality of cylinders overlaps a period during which a molten resin is injected from a second cylinder of the plurality of cylinders for a preset period and that the molten resin is continuously injected from the plurality of cylinders.

5. An injection molding apparatus comprising:
the injection molding machine according to claim 1;
a valve connected to the cylinder and configured to block and release gas from entering the first space of the cylinder from the outside of the cylinder; and
a supply part configured to supply the resin material to the first space based on the flow of gas flowing into the first space of the cylinder from the outside of the cylinder when the valve is released.

6. The injection molding apparatus according to claim 5, comprising a robot arm connected to the injection molding machine.

7. An injection molding method for causing a torpedo piston to be slid inside a cylinder to an opposite side of the cylinder to which an injection part is fixed inside the cylinder to thereby plasticize a resin material supplied to a first space in the cylinder arranged on the side of the cylinder opposite to the side of the cylinder close to the injection part with the torpedo piston interposed therebetween among spaces of the first space and a second space in the cylinder arranged on the side of cylinder close to the injection part, and to cause a molten resin to flow into the second space in the cylinder and cause the torpedo piston to be slid toward the injection part inside the cylinder to thereby inject the molten resin from the injection part,
wherein a pressurizing piston inserted into the torpedo piston so that it can be slid, having a bottomed cylindrical shape with an end on the injection part side closed, and having an outer diameter equal to the inner diameter of the torpedo piston is caused to protrude toward the second space of the cylinder by an elastic body arranged inside the pressurizing position in such a way that an amount of increase in the volume of the second space of the cylinder becomes equal to or smaller than an amount of decrease in the volume of the first space of the cylinder when the torpedo piston moves toward the side of the cylinder opposite to the side of the cylinder close to the injection part in order to plasticize the resin material; and
as the pressure of the molten resin flowing into the second space of the cylinder rises, when a force pushing the pressurizing piston in the opposite side to the injection part side exceeds a force energizing the pressurizing piston by the energizing means, the pressurizing piston is pushed in the opposite side to the injection part side.

8. The injection molding method according to claim 7, comprising causing a plurality of torpedo pistons to be slid inside respective cylinders to cause a period during which the molten resin is injected from at least a first cylinder of the plurality of cylinders to overlap a period during which the molten resin is injected from a second cylinder of the plurality of cylinders for a first preset period, and continuously injecting the molten resin from the plurality of cylinders.

9. The injection molding method according to claim 8, comprising causing, in each of the cylinders, a period during which the molten resin is injected to overlap a period during which the resin material is supplied to the cylinder for a second preset period.

10. The injection molding method according to claim 7, comprising supplying the resin material to the first space based on the flow of gas to the first space of the cylinder.

* * * * *